US012479606B1

United States Patent
England et al.

(10) Patent No.: US 12,479,606 B1
(45) Date of Patent: Nov. 25, 2025

(54) INDOOR AERIAL VEHICLES WITH ADVANCED SAFETY FEATURES

(71) Applicant: Amazon Technologies, Inc., Seattle, WA (US)

(72) Inventors: Matthew J. England, Santa Monica, CA (US); Ismail Gungor, Gdansk (PL); Oleksii Krasnoshchok, Gdynia (PL); Michael Kalajian, Calabasas, CA (US); Wen-Yo Lu, Pasadena, CA (US); Kevin Yu, Los Angeles, CA (US); Anay Joshi, Gdansk (PL)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 18/193,494

(22) Filed: Mar. 30, 2023

(51) Int. Cl.
*B64U 20/70* (2023.01)
*B64D 47/02* (2006.01)
(Continued)

(52) U.S. Cl.
CPC ............. *B64U 10/14* (2023.01); *B64D 47/02* (2013.01); *B64U 20/70* (2023.01); *B64U 20/87* (2023.01);
(Continued)

(58) Field of Classification Search
CPC ...... B64U 30/26; B64U 30/299; B64U 50/14; B64U 80/25; B64U 80/30; B64U 20/70; B64U 20/75; B64U 70/97
See application file for complete search history.

(56) References Cited

U.S. PATENT DOCUMENTS

| 3,417,729 A | 12/1968 | Gilday et al. |
| 3,575,527 A | 4/1971 | Sumitani et al. |

(Continued)

FOREIGN PATENT DOCUMENTS

| CN | 101385059 A | 3/2009 |
| CN | 103224026 A | 7/2013 |

(Continued)

OTHER PUBLICATIONS

Andrew Amato, "Parrot Announces New Bobop Drone", Dronelife.com, May 12, 2014; http://dronelife.com/2014/05/12/parrot-announces-new-bebop-drone/, accessed Dec. 21, 2016.

(Continued)

*Primary Examiner* — Joshua J Michener
*Assistant Examiner* — Colin Zohoor
(74) *Attorney, Agent, or Firm* — Athorus, PLLC

(57) ABSTRACT

An aerial vehicle configured for operation within indoor spaces has a meshed construction with a housing defined by upper and lower sections having meshes provided above and below propellers and motors of the aerial vehicle. The aerial vehicle also includes a suite of sensors such as LIDAR sensors, time-of-flight sensors, cameras, ultrasonic sensors, or others. Meshes of the upper and lower sections include central openings along with spokes and concentric rings provided about the central openings. Meshes of the lower section have substantially larger central openings than meshes of the upper section, but feature more dense spokes or concentric rings beneath tips of the rotating propellers, which may be hinged or foldable in nature. Data captured by sensors of the aerial vehicle may be utilized for any purpose, such as to generate environment maps of an indoor space, or to monitor the indoor space for adverse conditions or events.

22 Claims, 12 Drawing Sheets

(51) Int. Cl.
  *B64U 10/14* (2023.01)
  *B64U 20/87* (2023.01)
  *B64U 50/10* (2023.01)
  *B64U 60/50* (2023.01)
  *B64U 101/30* (2023.01)
  *B64U 101/70* (2023.01)

(52) U.S. Cl.
  CPC ............ *B64U 50/10* (2023.01); *B64U 60/50* (2023.01); *B64U 2101/30* (2023.01); *B64U 2101/70* (2023.01)

(56) References Cited

U.S. PATENT DOCUMENTS

| | | |
|---|---|---|
| 3,805,723 A | 4/1974 | Bernaerts |
| 4,865,248 A | 9/1989 | Barth |
| 4,954,962 A | 9/1990 | Evans, Jr. et al. |
| 5,040,116 A | 8/1991 | Evans, Jr. et al. |
| 5,283,739 A | 2/1994 | Summerville et al. |
| 5,371,581 A | 12/1994 | Wangler et al. |
| 5,386,462 A | 1/1995 | Schlamp |
| 5,452,374 A | 9/1995 | Cullen et al. |
| 5,497,236 A | 3/1996 | Wolff et al. |
| 5,731,884 A | 3/1998 | Inoue |
| 5,847,522 A | 12/1998 | Barba |
| 5,901,253 A | 5/1999 | Tretter |
| 5,995,898 A | 11/1999 | Tuttle |
| 6,031,612 A | 2/2000 | Shirley |
| 6,266,577 B1 | 7/2001 | Popp et al. |
| 6,344,796 B1 | 2/2002 | Ogilvie et al. |
| 6,374,155 B1 | 4/2002 | Wallach et al. |
| 6,426,699 B1 | 7/2002 | Porter |
| 6,507,670 B1 | 1/2003 | Moed |
| 6,543,983 B1 | 4/2003 | Felder et al. |
| 6,636,781 B1 | 10/2003 | Shen et al. |
| 6,676,460 B1 | 1/2004 | Motsenbocker |
| 6,690,997 B2 | 2/2004 | Rivalto |
| 6,694,217 B2 | 2/2004 | Bloom |
| 6,705,523 B1 | 3/2004 | Stamm et al. |
| 6,804,607 B1 | 10/2004 | Wood |
| 6,919,803 B2 | 7/2005 | Breed |
| 6,954,290 B1 | 10/2005 | Braudaway et al. |
| 6,961,711 B1 | 11/2005 | Chee |
| 6,965,440 B1 | 11/2005 | Nakagiri et al. |
| 6,970,838 B1 | 11/2005 | Kamath et al. |
| 7,006,952 B1 | 2/2006 | Matsumoto et al. |
| 7,016,536 B1 | 3/2006 | Ling et al. |
| 7,031,519 B2 | 4/2006 | Elmenhurst |
| 7,129,817 B2 | 10/2006 | Yamagishi |
| 7,133,743 B2 | 11/2006 | Tilles et al. |
| 7,145,699 B2 | 12/2006 | Dolan |
| 7,149,611 B2 | 12/2006 | Beck et al. |
| 7,171,879 B2 | 2/2007 | Gass et al. |
| 7,188,513 B2 | 3/2007 | Wilson |
| 7,335,071 B1 | 2/2008 | Motsenbocker |
| 7,337,686 B2 | 3/2008 | Sagi-Dolev |
| 7,337,944 B2 | 3/2008 | Devar |
| 7,339,993 B1 | 3/2008 | Brooks et al. |
| 7,459,880 B1 | 12/2008 | Rosen |
| 7,639,386 B1 | 12/2009 | Siegel et al. |
| 7,668,404 B2 | 2/2010 | Adams et al. |
| 7,673,831 B2 | 3/2010 | Steele et al. |
| 7,685,953 B2 | 3/2010 | Giles |
| 7,693,745 B1 | 4/2010 | Pomerantz et al. |
| 7,894,939 B2 | 2/2011 | Zini et al. |
| 7,925,375 B2 | 4/2011 | Schininger et al. |
| 7,946,526 B2 | 5/2011 | Zimet |
| 7,946,530 B1 | 5/2011 | Talmage, Jr. |
| 7,966,093 B2 | 6/2011 | Zhuk |
| 8,015,023 B1 | 9/2011 | Lee et al. |
| 8,078,317 B2 | 12/2011 | Allinson et al. |
| 8,126,642 B2 | 2/2012 | Trepagnier et al. |
| 8,131,607 B2 | 3/2012 | Park et al. |
| 8,145,351 B2 | 3/2012 | Schininger et al. |
| 8,195,328 B2 | 6/2012 | Mallett et al. |
| 8,286,236 B2 | 10/2012 | Jung et al. |
| 8,412,588 B1 | 4/2013 | Bodell et al. |
| 8,418,959 B2 | 4/2013 | Kang et al. |
| 8,429,754 B2 | 4/2013 | Jung et al. |
| 8,473,189 B2 | 6/2013 | Christoph |
| 8,511,606 B1 | 8/2013 | Lutke et al. |
| 8,577,538 B2 | 11/2013 | Lenser et al. |
| 8,599,027 B2 | 12/2013 | Sanchez |
| 8,602,349 B2 | 12/2013 | Petrov |
| 8,639,400 B1 | 1/2014 | Wong |
| 8,736,820 B2 | 5/2014 | Choe et al. |
| 8,752,166 B2 | 6/2014 | Jung et al. |
| 8,791,790 B2 | 7/2014 | Robertson et al. |
| 8,874,301 B1 | 10/2014 | Rao et al. |
| 8,899,903 B1 | 12/2014 | Saad et al. |
| 8,948,914 B2 | 2/2015 | Zini et al. |
| 8,956,100 B2 | 2/2015 | Davi et al. |
| 8,989,053 B1 | 3/2015 | Skaaksrud et al. |
| 9,033,285 B2 | 5/2015 | Iden et al. |
| 9,051,043 B1 | 6/2015 | Peeters et al. |
| 9,079,587 B1 | 7/2015 | Rupp et al. |
| 9,139,310 B1 | 9/2015 | Wang |
| 9,163,909 B2 | 10/2015 | Chengalva |
| 9,193,452 B2 | 11/2015 | Carreker |
| 9,195,959 B1 | 11/2015 | Lopez et al. |
| 9,216,587 B2 | 12/2015 | Ando et al. |
| 9,216,857 B1 | 12/2015 | Kalyan et al. |
| 9,230,236 B2 | 1/2016 | Villamar |
| 9,235,213 B2 | 1/2016 | Villamar |
| 9,244,147 B1 | 1/2016 | Soundararajan et al. |
| 9,256,852 B1 | 2/2016 | Myllymaki |
| 9,261,578 B2 | 2/2016 | Im et al. |
| 9,321,531 B1 | 4/2016 | Takayama et al. |
| 9,336,506 B2 | 5/2016 | Shucker et al. |
| 9,336,635 B2 | 5/2016 | Robertson et al. |
| 9,358,975 B1 | 6/2016 | Watts |
| 9,373,149 B2 | 6/2016 | Abhyanker |
| 9,381,916 B1 | 7/2016 | Zhu et al. |
| 9,397,518 B1 | 7/2016 | Theobald |
| 9,404,761 B2 | 8/2016 | Meuleau |
| 9,409,644 B2 | 8/2016 | Stanek et al. |
| 9,411,337 B1 | 8/2016 | Theobald et al. |
| 9,412,280 B1 | 8/2016 | Zwillinger et al. |
| 9,436,183 B2 | 9/2016 | Thakur et al. |
| 9,436,926 B2 | 9/2016 | Cousins et al. |
| 9,448,559 B2 | 9/2016 | Kojo et al. |
| 9,489,490 B1 | 11/2016 | Theobald |
| 9,510,316 B2 | 11/2016 | Skaaksrud |
| 9,535,421 B1 | 1/2017 | Canoso et al. |
| 9,545,852 B2 | 1/2017 | Streett |
| 9,561,941 B1 | 2/2017 | Watts |
| 9,563,201 B1 | 2/2017 | Tofte et al. |
| 9,568,335 B2 | 2/2017 | Thakur et al. |
| 9,582,950 B2 | 2/2017 | Shimizu et al. |
| 9,600,645 B2 | 3/2017 | Fadell et al. |
| 9,619,776 B1 | 4/2017 | Ford et al. |
| 9,623,553 B1 | 4/2017 | Theobald et al. |
| 9,623,562 B1 | 4/2017 | Watts |
| 9,650,136 B1 | 5/2017 | Haskin et al. |
| 9,652,912 B2 | 5/2017 | Fadell et al. |
| 9,656,805 B1 | 5/2017 | Evans et al. |
| 9,671,791 B1 | 6/2017 | Paczan |
| 9,677,564 B1 | 6/2017 | Woodworth et al. |
| 9,682,481 B2 | 6/2017 | Lutz et al. |
| 9,697,730 B2 | 7/2017 | Thakur et al. |
| 9,718,564 B1 | 8/2017 | Beckman et al. |
| 9,720,414 B1 | 8/2017 | Theobald |
| 9,731,821 B2 | 8/2017 | Hoareau et al. |
| 9,733,646 B1 | 8/2017 | Nusser et al. |
| 9,746,852 B1 | 8/2017 | Watts et al. |
| 9,746,853 B2 | 8/2017 | Scheepjens et al. |
| 9,778,653 B1 | 10/2017 | McClintock et al. |
| 9,786,187 B1 | 10/2017 | Bar-Zeev et al. |
| 9,796,529 B1 | 10/2017 | Hoareau et al. |
| 9,828,092 B1 | 11/2017 | Navot et al. |
| 9,858,604 B2 | 1/2018 | Apsley et al. |
| 9,886,035 B1 | 2/2018 | Watts et al. |
| 9,896,204 B1 | 2/2018 | Willison |
| 9,959,771 B1 | 5/2018 | Carlson |

(56) References Cited

U.S. PATENT DOCUMENTS

| | | |
|---|---|---|
| 9,959,773 B2 | 5/2018 | Raptopoulos et al. |
| 9,974,612 B2 | 5/2018 | Pinter et al. |
| 10,022,753 B2 | 7/2018 | Chelian et al. |
| 10,022,867 B2 | 7/2018 | Saboo et al. |
| 10,048,697 B1 | 8/2018 | Theobald |
| 10,108,185 B1 | 10/2018 | Theobald |
| 10,137,984 B1 | 11/2018 | Flick |
| 10,558,226 B1 | 2/2020 | Bigdeli |
| 10,649,469 B2 | 5/2020 | Salas-Moreno et al. |
| 10,745,132 B1 | 8/2020 | Kimchi |
| 10,780,988 B2 | 9/2020 | Buchmueller et al. |
| 10,860,115 B1 | 12/2020 | Tran |
| 11,164,149 B1 | 11/2021 | Williams et al. |
| 11,619,952 B2 | 4/2023 | Kwon et al. |
| 11,628,932 B2 | 4/2023 | Seung et al. |
| 11,649,050 B1 | 5/2023 | Miller |
| 11,726,184 B2 | 8/2023 | Ferreira et al. |
| 11,808,580 B1 | 11/2023 | Ebrahimi Afrouzi et al. |
| D1,008,873 S * | 12/2023 | Lin .............. D12/16.1 |
| 11,851,162 B1 * | 12/2023 | Daube .............. B64U 20/70 |
| 11,868,146 B2 | 1/2024 | Yasunaga et al. |
| 11,933,613 B2 | 3/2024 | Michini et al. |
| 2001/0045449 A1 | 11/2001 | Shannon |
| 2002/0016726 A1 | 2/2002 | Ross |
| 2002/0035450 A1 | 3/2002 | Thackston |
| 2002/0072979 A1 | 6/2002 | Sinha et al. |
| 2002/0087375 A1 | 7/2002 | Griffin et al. |
| 2002/0107751 A1 | 8/2002 | Rajagopalan et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2002/0156645 A1 | 10/2002 | Hansen |
| 2003/0040980 A1 | 2/2003 | Nakajima et al. |
| 2003/0072031 A1 | 4/2003 | Kuwata et al. |
| 2003/0121968 A1 | 7/2003 | Miller et al. |
| 2003/0141411 A1 | 7/2003 | Pandya et al. |
| 2004/0002898 A1 | 1/2004 | Kuhlmann et al. |
| 2004/0068416 A1 | 4/2004 | Solomon |
| 2004/0112660 A1 | 6/2004 | Johansson et al. |
| 2004/0160335 A1 | 8/2004 | Reitmeier et al. |
| 2004/0162638 A1 | 8/2004 | Solomon |
| 2004/0257199 A1 | 12/2004 | Fitzgibbon et al. |
| 2005/0068178 A1 | 3/2005 | Lee et al. |
| 2005/0093865 A1 | 5/2005 | Jia |
| 2005/0102240 A1 | 5/2005 | Misra et al. |
| 2005/0244060 A1 | 11/2005 | Nagarajan et al. |
| 2005/0285934 A1 | 12/2005 | Carter |
| 2006/0053534 A1 | 3/2006 | Mullen |
| 2006/0118162 A1 | 6/2006 | Saelzer et al. |
| 2006/0136237 A1 | 6/2006 | Spiegel et al. |
| 2006/0287829 A1 | 12/2006 | Pashko-Paschenko |
| 2007/0016496 A1 | 1/2007 | Bar et al. |
| 2007/0073552 A1 | 3/2007 | Hileman |
| 2007/0102565 A1 | 5/2007 | Speer et al. |
| 2007/0150375 A1 | 6/2007 | Yang |
| 2007/0170237 A1 | 7/2007 | Neff |
| 2007/0210953 A1 | 9/2007 | Abraham et al. |
| 2007/0233337 A1 | 10/2007 | Plishner |
| 2007/0244763 A1 | 10/2007 | Williams et al. |
| 2007/0246601 A1 | 10/2007 | Layton |
| 2007/0262195 A1 | 11/2007 | Bulaga et al. |
| 2007/0293978 A1 | 12/2007 | Wurman et al. |
| 2008/0012697 A1 | 1/2008 | Smith et al. |
| 2008/0027591 A1 | 1/2008 | Lenser et al. |
| 2008/0100258 A1 | 5/2008 | Ward |
| 2008/0109246 A1 | 5/2008 | Russell |
| 2008/0111816 A1 | 5/2008 | Abraham et al. |
| 2008/0141921 A1 | 6/2008 | Hinderks |
| 2008/0150679 A1 | 6/2008 | Bloomfield |
| 2008/0154659 A1 | 6/2008 | Bettes et al. |
| 2008/0167817 A1 | 7/2008 | Hessler et al. |
| 2008/0184906 A1 | 8/2008 | Kejha |
| 2008/0189012 A1 | 8/2008 | Kaufmann |
| 2008/0301009 A1 | 12/2008 | Plaster et al. |
| 2009/0027253 A1 | 1/2009 | Tooren et al. |
| 2009/0062974 A1 | 3/2009 | Tamamoto et al. |
| 2009/0063166 A1 | 3/2009 | Palmer |
| 2009/0079388 A1 | 3/2009 | Reddy |
| 2009/0086275 A1 | 4/2009 | Liang et al. |
| 2009/0091435 A1 | 4/2009 | Bolourchi |
| 2009/0106124 A1 | 4/2009 | Yang |
| 2009/0149985 A1 | 6/2009 | Chirnomas |
| 2009/0164379 A1 | 6/2009 | Jung et al. |
| 2009/0165127 A1 | 6/2009 | Jung et al. |
| 2009/0216394 A1 * | 8/2009 | Heppe .............. B64U 20/87 |
| | | 701/16 |
| 2009/0236470 A1 | 9/2009 | Goossen et al. |
| 2009/0254457 A1 | 10/2009 | Folsom |
| 2009/0254482 A1 | 10/2009 | Vadlamani et al. |
| 2009/0299903 A1 | 12/2009 | Hung et al. |
| 2009/0303507 A1 | 12/2009 | Abeloe |
| 2009/0314883 A1 | 12/2009 | Arlton et al. |
| 2010/0007479 A1 | 1/2010 | Smith |
| 2010/0030608 A1 | 2/2010 | Kaminsky et al. |
| 2010/0031351 A1 | 2/2010 | Jung et al. |
| 2010/0088163 A1 | 4/2010 | Davidson et al. |
| 2010/0088175 A1 | 4/2010 | Lundquist |
| 2010/0100269 A1 | 4/2010 | Ekhaguere et al. |
| 2010/0169185 A1 | 7/2010 | Cottingham |
| 2010/0206145 A1 | 8/2010 | Tetelbaum et al. |
| 2010/0287065 A1 | 11/2010 | Alivandi |
| 2010/0299067 A1 | 11/2010 | McCollough et al. |
| 2010/0299222 A1 | 11/2010 | Hamilton et al. |
| 2011/0035149 A1 | 2/2011 | McAndrew et al. |
| 2011/0074570 A1 | 3/2011 | Feldstein et al. |
| 2011/0087350 A1 | 4/2011 | Fogel et al. |
| 2011/0112761 A1 | 5/2011 | Hurley et al. |
| 2011/0153052 A1 | 6/2011 | Pettibone et al. |
| 2011/0166707 A1 | 7/2011 | Romanov et al. |
| 2011/0178711 A1 | 7/2011 | Christoph |
| 2011/0210866 A1 | 9/2011 | David et al. |
| 2011/0227435 A1 | 9/2011 | Maeda |
| 2011/0246331 A1 | 10/2011 | Luther et al. |
| 2011/0253831 A1 | 10/2011 | Cheng |
| 2011/0264311 A1 | 10/2011 | Lee et al. |
| 2011/0282476 A1 | 11/2011 | Hegemier et al. |
| 2011/0301787 A1 | 12/2011 | Chaperon et al. |
| 2011/0313878 A1 | 12/2011 | Norman |
| 2012/0039694 A1 | 2/2012 | Suzanne |
| 2012/0078592 A1 | 3/2012 | Sims |
| 2012/0091260 A1 | 4/2012 | Callou |
| 2012/0109419 A1 | 5/2012 | Mercado |
| 2012/0219397 A1 | 8/2012 | Baker |
| 2012/0221438 A1 | 8/2012 | Cook et al. |
| 2012/0227389 A1 | 9/2012 | Hinderks |
| 2012/0229325 A1 | 9/2012 | Dutruc |
| 2012/0234969 A1 | 9/2012 | Savoye et al. |
| 2012/0235606 A1 | 9/2012 | Takeuchi |
| 2012/0323365 A1 | 12/2012 | Taylor et al. |
| 2013/0006739 A1 | 1/2013 | Horvitz et al. |
| 2013/0073477 A1 | 3/2013 | Grinberg |
| 2013/0081245 A1 | 4/2013 | Vavrina et al. |
| 2013/0093582 A1 | 4/2013 | Walsh et al. |
| 2013/0126611 A1 | 5/2013 | Kangas et al. |
| 2013/0148123 A1 | 6/2013 | Hayashi |
| 2013/0193269 A1 * | 8/2013 | Zwaan .............. B64U 70/10 |
| | | 244/118.1 |
| 2013/0206915 A1 | 8/2013 | Desaulniers |
| 2013/0218446 A1 | 8/2013 | Bradley et al. |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2013/0320133 A1 | 12/2013 | Ratti et al. |
| 2013/0324164 A1 | 12/2013 | Vulcano |
| 2013/0332062 A1 | 12/2013 | Kreitmair-Steck et al. |
| 2014/0010656 A1 | 1/2014 | Nies |
| 2014/0022055 A1 | 1/2014 | Levien et al. |
| 2014/0025230 A1 | 1/2014 | Levien et al. |
| 2014/0030444 A1 | 1/2014 | Swaminathan et al. |
| 2014/0031964 A1 | 1/2014 | Sidhu et al. |

(56) References Cited

U.S. PATENT DOCUMENTS

| | | |
|---|---|---|
| 2014/0032034 A1 | 1/2014 | Raptopoulos et al. |
| 2014/0040065 A1 | 2/2014 | DuBois |
| 2014/0052661 A1 | 2/2014 | Shakes et al. |
| 2014/0058959 A1 | 2/2014 | Isbjornssund et al. |
| 2014/0081445 A1 | 3/2014 | Villamar |
| 2014/0089073 A1 | 3/2014 | Jacobs et al. |
| 2014/0136282 A1 | 5/2014 | Fedele |
| 2014/0136414 A1 | 5/2014 | Abhyanker |
| 2014/0149244 A1 | 5/2014 | Abhyanker |
| 2014/0156053 A1 | 6/2014 | Mahdavi et al. |
| 2014/0180914 A1 | 6/2014 | Abhyanker |
| 2014/0200697 A1 | 7/2014 | Cheng |
| 2014/0214684 A1 | 7/2014 | Pell |
| 2014/0244433 A1 | 8/2014 | Cruz |
| 2014/0254896 A1 | 9/2014 | Zhou et al. |
| 2014/0271200 A1 | 9/2014 | Sutton et al. |
| 2014/0283104 A1 | 9/2014 | Nilsson |
| 2014/0309813 A1 | 10/2014 | Ricci |
| 2014/0325218 A1 | 10/2014 | Shimizu et al. |
| 2014/0330456 A1 | 11/2014 | Morales et al. |
| 2015/0006005 A1 | 1/2015 | Yu et al. |
| 2015/0066178 A1 | 3/2015 | Stava |
| 2015/0069968 A1 | 3/2015 | Pounds |
| 2015/0098819 A1 | 4/2015 | Tourin et al. |
| 2015/0102154 A1 | 4/2015 | Duncan et al. |
| 2015/0112837 A1 | 4/2015 | O'Dea |
| 2015/0112885 A1 | 4/2015 | Fadell et al. |
| 2015/0120094 A1 | 4/2015 | Kimchi et al. |
| 2015/0120602 A1 | 4/2015 | Huffman et al. |
| 2015/0127712 A1 | 5/2015 | Fadell et al. |
| 2015/0129716 A1 | 5/2015 | Yoffe |
| 2015/0153175 A1 | 6/2015 | Skaaksrud |
| 2015/0154545 A1 | 6/2015 | Skaaksrud et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0191255 A1 | 7/2015 | Zolich et al. |
| 2015/0193971 A1 | 7/2015 | Dryanovski et al. |
| 2015/0202770 A1 | 7/2015 | Patron et al. |
| 2015/0227882 A1 | 8/2015 | Bhatt |
| 2015/0246727 A1 | 9/2015 | Masticola et al. |
| 2015/0253777 A1 | 9/2015 | Binney et al. |
| 2015/0254611 A1 | 9/2015 | Perez |
| 2015/0259078 A1 | 9/2015 | Filipovic et al. |
| 2015/0286216 A1 | 10/2015 | Miwa |
| 2015/0314881 A1 | 11/2015 | Tsaliah et al. |
| 2015/0317597 A1 | 11/2015 | Shucker et al. |
| 2015/0332206 A1 | 11/2015 | Trew et al. |
| 2015/0336670 A1* | 11/2015 | Zhang .................. B29C 43/18 244/119 |
| 2015/0367850 A1 | 12/2015 | Clarke et al. |
| 2015/0370251 A1 | 12/2015 | Siegel et al. |
| 2016/0001877 A1 | 1/2016 | Paulos |
| 2016/0009413 A1 | 1/2016 | Lee et al. |
| 2016/0019495 A1 | 1/2016 | Kolchin |
| 2016/0033966 A1 | 2/2016 | Farris et al. |
| 2016/0051110 A1 | 2/2016 | Cao et al. |
| 2016/0058181 A1 | 3/2016 | Han et al. |
| 2016/0068267 A1 | 3/2016 | Liu et al. |
| 2016/0070265 A1 | 3/2016 | Liu et al. |
| 2016/0085238 A1 | 3/2016 | Hayes |
| 2016/0104099 A1 | 4/2016 | Villamar |
| 2016/0104113 A1 | 4/2016 | Gorlin |
| 2016/0107750 A1 | 4/2016 | Yates |
| 2016/0114488 A1 | 4/2016 | Medina et al. |
| 2016/0117931 A1 | 4/2016 | Chan et al. |
| 2016/0125746 A1 | 5/2016 | Kunzi et al. |
| 2016/0129592 A1 | 5/2016 | Saboo et al. |
| 2016/0130015 A1 | 5/2016 | Caubel et al. |
| 2016/0132059 A1 | 5/2016 | Mason et al. |
| 2016/0144734 A1 | 5/2016 | Wang et al. |
| 2016/0144982 A1 | 5/2016 | Sugumaran |
| 2016/0180618 A1 | 6/2016 | Ho et al. |
| 2016/0196755 A1 | 7/2016 | Navot et al. |
| 2016/0196756 A1 | 7/2016 | Prakash et al. |
| 2016/0200438 A1 | 7/2016 | Bokeno et al. |
| 2016/0207627 A1 | 7/2016 | Hoareau et al. |
| 2016/0214717 A1 | 7/2016 | Silva |
| 2016/0214728 A1 | 7/2016 | Rossi et al. |
| 2016/0221671 A1* | 8/2016 | Fisher .................. B64U 30/26 |
| 2016/0229530 A1 | 8/2016 | Welsh et al. |
| 2016/0235236 A1 | 8/2016 | Byers et al. |
| 2016/0236778 A1 | 8/2016 | Takayama et al. |
| 2016/0239789 A1 | 8/2016 | Hanks |
| 2016/0239803 A1 | 8/2016 | Borley et al. |
| 2016/0257401 A1 | 9/2016 | Buchmueller et al. |
| 2016/0258775 A1 | 9/2016 | Santilli et al. |
| 2016/0266578 A1 | 9/2016 | Douglas et al. |
| 2016/0282126 A1 | 9/2016 | Watts et al. |
| 2016/0299233 A1 | 10/2016 | Levien et al. |
| 2016/0321503 A1 | 11/2016 | Zhou |
| 2016/0334229 A1 | 11/2016 | Ross et al. |
| 2016/0340021 A1 | 11/2016 | Zhang et al. |
| 2016/0364660 A1 | 12/2016 | Brown |
| 2016/0364679 A1 | 12/2016 | Cao |
| 2016/0364823 A1 | 12/2016 | Cao |
| 2016/0364989 A1 | 12/2016 | Speasl et al. |
| 2016/0371984 A1 | 12/2016 | Macfarlane et al. |
| 2017/0011333 A1 | 1/2017 | Greiner et al. |
| 2017/0011340 A1 | 1/2017 | Gabbai |
| 2017/0032315 A1 | 2/2017 | Gupta et al. |
| 2017/0087999 A1 | 3/2017 | Miller et al. |
| 2017/0096222 A1 | 4/2017 | Spinelli et al. |
| 2017/0098378 A1 | 4/2017 | Soundararajan et al. |
| 2017/0100837 A1 | 4/2017 | Zevenbergen et al. |
| 2017/0101017 A1 | 4/2017 | Streett |
| 2017/0113352 A1 | 4/2017 | Lutz et al. |
| 2017/0147975 A1 | 5/2017 | Natarajan et al. |
| 2017/0152060 A1* | 6/2017 | Morisawa ............ H04N 7/185 |
| 2017/0154347 A1 | 6/2017 | Bateman |
| 2017/0164319 A1 | 6/2017 | Skaaksrud et al. |
| 2017/0167881 A1 | 6/2017 | Rander et al. |
| 2017/0193442 A1 | 7/2017 | Ekkel et al. |
| 2017/0199522 A1 | 7/2017 | Li et al. |
| 2017/0225783 A1* | 8/2017 | Fisher .................. B64D 27/40 |
| 2017/0255896 A1 | 9/2017 | Dyke |
| 2017/0286905 A1 | 10/2017 | Richardson et al. |
| 2017/0300855 A1 | 10/2017 | Lund et al. |
| 2017/0305526 A1 | 10/2017 | Thomassey |
| 2017/0308098 A1 | 10/2017 | Yu et al. |
| 2017/0316379 A1 | 11/2017 | Lepek et al. |
| 2017/0330145 A1 | 11/2017 | Studnicka et al. |
| 2017/0345245 A1 | 11/2017 | Torresani et al. |
| 2017/0372256 A1 | 12/2017 | Kantor et al. |
| 2018/0024554 A1 | 1/2018 | Brady et al. |
| 2018/0088586 A1 | 3/2018 | Hance et al. |
| 2018/0127211 A1 | 5/2018 | Jarvis et al. |
| 2018/0137454 A1 | 5/2018 | Kulkarni et al. |
| 2018/0203464 A1 | 7/2018 | Yu et al. |
| 2018/0257775 A1* | 9/2018 | Baek .................... B64C 27/006 |
| 2019/0051192 A1 | 2/2019 | Schick et al. |
| 2019/0135403 A1 | 5/2019 | Perry et al. |
| 2019/0161190 A1 | 5/2019 | Gil et al. |
| 2019/0172358 A1 | 6/2019 | Zhou et al. |
| 2020/0272144 A1* | 8/2020 | Yang .................... B64U 10/14 |
| 2020/0284883 A1 | 9/2020 | Ferreira et al. |
| 2020/0324898 A1 | 10/2020 | Youmans et al. |
| 2020/0369384 A1 | 11/2020 | Kelly |
| 2021/0089055 A1 | 3/2021 | Tran |
| 2021/0094686 A1* | 4/2021 | Metzner ............ G08B 13/1965 |
| 2022/0009647 A1 | 1/2022 | Johannesson et al. |
| 2022/0144424 A1 | 5/2022 | Metzner et al. |
| 2022/0162001 A1 | 5/2022 | Gherardi et al. |
| 2022/0163980 A1 | 5/2022 | Beer et al. |
| 2023/0065140 A1* | 3/2023 | Blevins ................ B64U 20/40 |
| 2023/0244249 A1 | 8/2023 | Smith et al. |
| 2023/0298268 A1 | 9/2023 | Oleynikova et al. |

FOREIGN PATENT DOCUMENTS

| | | |
|---|---|---|
| CN | 203039518 U | 7/2013 |
| CN | 103365297 A | 10/2013 |
| CN | 104760704 A | 7/2015 |

(56) References Cited

FOREIGN PATENT DOCUMENTS

| | | |
|---|---|---|
| CN | 109118826 A | 1/2019 |
| DE | 102011086497 A1 | 5/2013 |
| EP | 3415436 A1 | 12/2018 |
| FR | 2692064 A1 | 12/1993 |
| GB | 2455374 A | 6/2009 |
| JP | S48088255 U | 10/1973 |
| JP | S56048952 | 11/1981 |
| JP | H0712088 A | 1/1995 |
| JP | 2004126800 A | 4/2004 |
| JP | 2009297449 A | 12/2009 |
| JP | 2010095246 A | 4/2010 |
| JP | 2011211025 A | 10/2011 |
| JP | 2012037204 A | 2/2012 |
| WO | 2007052246 A1 | 5/2007 |
| WO | 2008147484 A2 | 12/2008 |
| WO | 2008147484 A3 | 2/2009 |
| WO | 2009153588 A1 | 12/2009 |
| WO | 2010070717 A1 | 6/2010 |
| WO | 2012012752 A2 | 1/2012 |
| WO | 2012012752 A9 | 6/2012 |
| WO | 2013140085 A1 | 9/2013 |
| WO | 2013148123 A1 | 10/2013 |
| WO | 2014064431 A2 | 5/2014 |
| WO | 2014068982 A1 | 5/2014 |
| WO | 2014080409 A1 | 5/2014 |
| WO | 2014064431 A3 | 7/2014 |
| WO | 2017064202 A1 | 4/2017 |
| WO | 2017186137 A1 | 11/2017 |
| WO | 2018136753 A1 | 7/2018 |
| WO | 2018156991 A1 | 8/2018 |

OTHER PUBLICATIONS

Ivan Barajas, "Parrot Unveils New Drone and Controller," May 14, 2014; https://blog.newegg.com/parrot-unveils-drone-controller-oculus-compatible/, accessed Dec. 21, 2016.

Microchip Technology Inc. AT42QT1010 Data Sheet. Copyright © 2017 Microchip Technology Inc. 30 pages.

MicroPilot home page, https://www.micropilot.com/; archived on Jan. 3, 2013 by Internet Archive, http://web.archive.org/web/2013103180733/http://www.micropilot.com/?, accessed May 2, 2016.

Norman Chan, "Hands-On with Parrot's Bebop Drone Quadcopter", tested.com, May 12, 2014; http://www.tested.com/tech/robots/461148-parrots-bebop-drone-what-you-should-know/, accessed Dec. 22, 2016.

rchelicopterfun.com, "Parrot AF Drone Quadcopter Review", http://www.rchelicopterfun.com/parrot-ar-drone.html; archived on Mar. 27, 2012 by Internet Archive, http://web.archive.org/web/20120327140509/http://www.rchelicopterfun.com/parrot-ar-drone.html, accessed Apr. 27, 2016.

Wang, David. Application Report: FDC1004: Basics of Capacitive Sensing and Applications. SNOA927A—Dec. 2014—Revised Jun. 2021. Copyright © 2021 Texas Instruments Incorporated. 12 pages.

Wikipedia, "Apollo Abort Modes", https://en.wikipedia.org/wiki/Apollo_abort_modes; archived by Internet Archive on Aug. 16, 2012, https://web.archive.org/web/20120816115115/https://en.wikipedia.org/wiki/Apollo_abort_modes; accessed Jul. 9, 2019 (Year: 2012).

Wikipedia, "Space Shuttle Abort Modes," https://en.wikipedia.org/wiki/Space_Shuttle_abort_modes; archived by Internet Archive on Aug. 15, 2012, https://web.archive.org/web/20120815031221/https://en.wikipedia.org/wiki/Space_Shuttle_abort_modes; accessed Jul. 9, 2019 (Year: 2012).

Bullock et al., "Analysis of the Use of Digital Road Maps in Vehicle Navigation," 1994, IEEE, p. 494-501 (Year: 1994).

DHL Trend Research, "Self-Driving Vehicles in Logistics," Dec. 2014, Markus Kückelhaus et al. (downloaded from http://www.dhl.com/content/dam/downloads/g0/about_us/logistics_insights/dhl_self_driving_vehicles.pdf with an archived Web version available on https://web.archive.org/web/20151018154844/ http://www.dhl.com/content/dam/downloads/g0/about_us/logistics_insights/dhl_self_driving_vehicles.pdf), 39 pages.

DHL Trend Research, "Unmanned Aerial Vehicles in Logistics: a DHL perspective on implications and use cases for the logistics industry," 2014, Markus Kückelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Hawas et al., "Infrastructureless Inter-Vehicular Real-Time Route Guidance," 2008, IEEE, p. 1213-1219 (Year: 2008).

Kais, Mikael et al., "An Intelligent architecture for automated transportation in our cities", 2001 European Control Conference (ECC), Porto, Portugal, Sep. 4-7, 2001, pp. 277-282 (Year: 2001).

Kladis et al., "Event-Based Energy Optimum Route Planning in the Context of Unmanned Aerial Vehicles for Multi-Objective Exploration Missions," 2009, IEEE, p. 1281-1286 (Year: 2009).

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Mike Murphy, "Google wants to deliver packages from self-driving trucks," published Feb. 9, 2016, URL: https://qz.com/613277/google-wants-to-deliver-packages-from-self-driving-trucks/, 4 pages.

Nanohawk Aeraccess: "Unmanned Aerial Vehicle—Aeraccess—Nanohawk—Webarchive Jun. 16, 2019", Jun. 16, 2019 (Jun. 16, 2019), pp. 1-3, XP055759013,URL: https://web.archive.org/web/20190616235755/http://www.aeraccess-group.com/product/indoor/nanohawk [Retrieved from the Internet: Dec. 10, 2020]; the whole document.

Navaravong et al., "Formation Reconfiguration for Mobile Robots with Network Connectivity Constraints," 2012, IEEE, p. 18-24 (Year: 2012).

Parent, Michel et al., "Intelligent Transportation in Cities with CTS", The IEEE 5th International Conference on Intelligent Transportation Systems, Sep. 3-6, 2002, Singapore, pp. 826-830 (Year: 2002).

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, 14 pages.

URL: https://web.archive.org/web/20160804001046/https://www.starship.xyz/, download date: Aug. 4, 2016, 21 pages.

Wikipedia, "Ramer-Douglas-Peucker Algorithm," www.wikipedia.com, Wikipedia: The Free Encyclopedia, 5 pages, Aug. 18, 2022, URL: https://en.wikipedia.org/wiki/Ramer%E2%80%93Douglas%E2%80%93Peucker_algorithm, obtained via web.archive.org on Jan. 6, 2023.

Elizondo-Leal, J. C., et al., "The Exact Euclidean Distance Transform: a New Algorithm for Universal Path Planning." www.intechopen.com, International Journal of Advanced Robotic Systems 10, No. 6 (2013): 266, www.researchgate. net, URL: https://www.researchgate.net/publication/274622763_The_Exact_Euclidean_Distance_Transform_A_New_Algorithm_for_Universal_Path_Planning.

Jung, J.W., et al., "Expanded Douglas-Peucker Polygonal Approximation and Opposite Angle-Based Exact Cell Decomposition for Path Planning With Curvilinear Obstacles." Applied Sciences 9, No. 4 (2019): 638, www.mdpi.com, Copyright 1996-2024 MDPI (Basel, Switzerland), URL: https://www.mdpi.com/2076-3417/9/4/638 (Year: 2019).

Sánchez-Ibáñez, J. R., et al., "Path Planning for Autonomous Mobile Robots: a Review," www.mdpi.com, Copyright 1996-2024 MDPI (Basel, Switzerland), URL: https://www.mdpi.com/1424-8220/21/23/7898 (Year: 2022).

Jiang, Ziwen. "An autonomous landing and charging system for drones." PhD diss., Massachusetts Institute of Technology, 2018, 71 pages.

Sánchez-Ibáñez, J. R., et al., "Path Planning for Autonomous Mobile Robots: a Review," www.mdpi.com, Copyright 1996-2024

(56) References Cited

OTHER PUBLICATIONS

MDPI (Basel, Switzerland), URL: https://www.mdpi.com/1424-8220/21/23/7898 (Year: 2021), 29 pages.

* cited by examiner

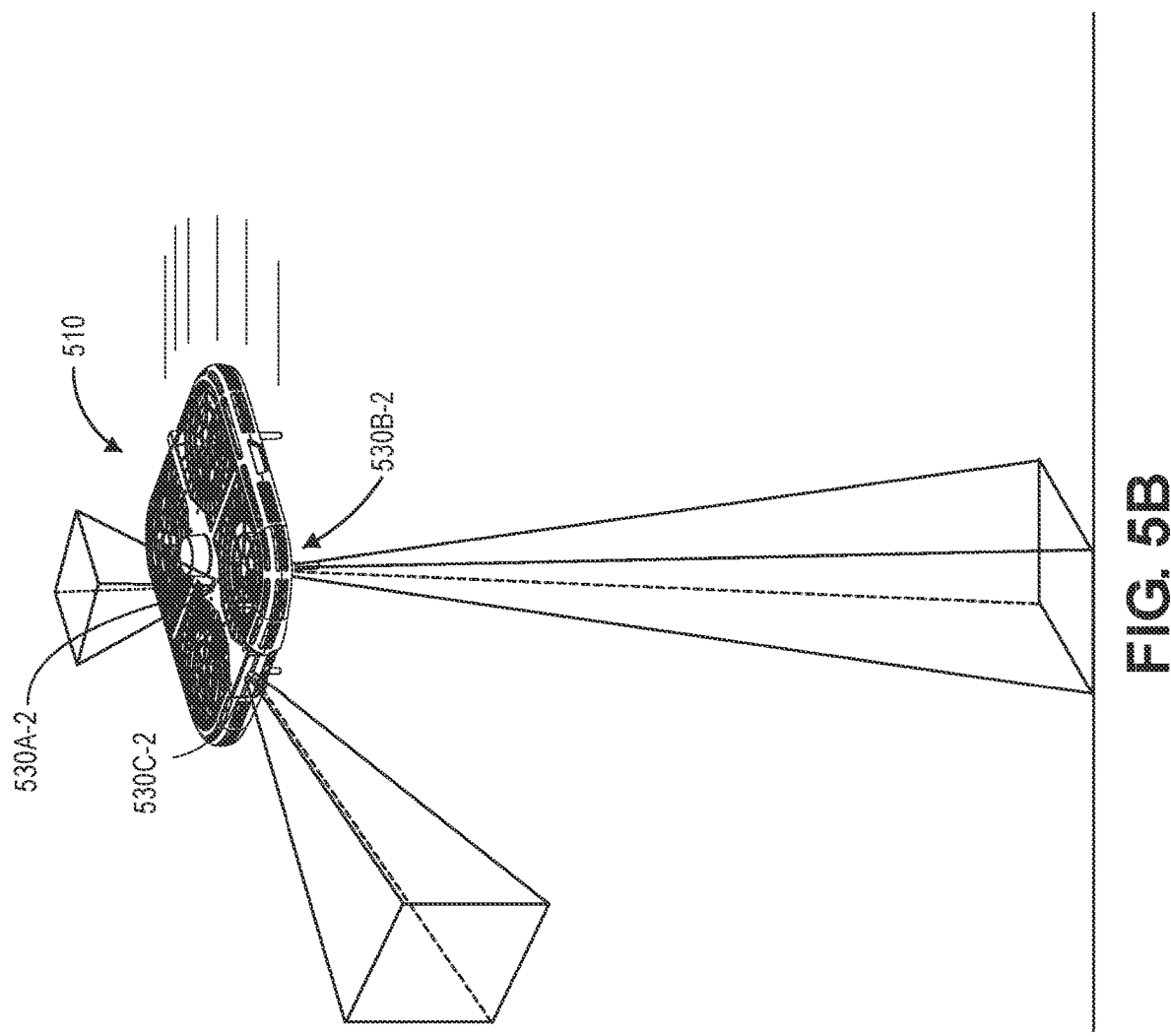

INDOOR AERIAL VEHICLES WITH ADVANCED SAFETY FEATURES

BACKGROUND

Aerial vehicles are most commonly operated in outdoor spaces. When an aerial vehicle operates in an outdoor space, the aerial vehicle may determine information regarding its position in three-dimensional space according to any number of techniques, and based on many types of information or data that may be obtained from any source. For example, an aerial vehicle operating outdoors may determine a position in three-dimensional space using a position sensor, e.g., a Global Positioning System ("GPS") receiver that captures signals from one or more satellites or other sources, as well as an inertial measurement unit (or "IMU"), one or more altimeters, barometers, or other components. An aerial vehicle operating outdoors may also typically climb above any encountered hazards by increasing altitude, in order to elevate above ground-based or airborne obstacles, which may include humans or other animals, or other stationary or moving objects. Because obstacles that are encountered outdoors, such as structures, plant life, or others, are often separated by comparatively large distances, and because outdoor spaces are typically sufficiently large, an aerial vehicle is typically able to make wide, smooth changes in course or altitude without risking contact with any obstacles, even where the aerial vehicle is operating at or near its maximum speeds.

Operating an unmanned aerial vehicle, or drone, within indoor spaces presents a unique set of challenges for the unmanned aerial vehicle, and creates unique risks for occupants or contents of the indoor spaces. An unmanned aerial vehicle that operates indoors may not typically rely on sensors or techniques to accurately determine an altitude, e.g., distances between the aerial vehicle and floors or ceilings, within an indoor space. For example, most GPS receivers may typically determine positions to within approximately two to five meters, a level of accuracy that is suitable in most outdoor applications but unreliable indoors, where distances between floors and ceilings are often three meters or less. Similarly, because differences in pressure within indoor spaces are minimal, altimeters or other systems that determine altitudes based on pressures are also not typically capable of determining a position of the aerial vehicle with respect to floors or ceilings of indoor spaces to any reliable extent. Likewise, because indoor spaces are commonly constrained by narrow hallways or other passageways, and feature limited operating areas between floors and ceilings, an unmanned aerial vehicle that operates indoors must often make tight turns or changes in altitude, or travel well below its maximum speeds, in order to avoid contacting walls, ceilings, floors or other structural features.

BRIEF DESCRIPTION OF THE DRAWINGS

FIGS. 5A through 5D are views of aspects of one aerial vehicle in accordance with implementations of the present disclosure.

DETAILED DESCRIPTION

As is set forth in greater detail below, the present disclosure is directed to aerial vehicles (e.g., drones), that are configured for operation within indoor spaces. More specifically, the aerial vehicles feature lightweight housings or bodies having comparatively low profiles that are outfitted with suites of sensors for monitoring conditions of the indoor spaces, such as LIDAR (or light detection and ranging) sensors, time-of-flight sensors, cameras or other imaging devices, or others, that are aligned at any angle with respect to an orientation or configuration of an aerial vehicle.

The housings or bodies of the aerial vehicles may have square or substantially square cross-sections with substantially constant heights. The housings or bodies are formed from meshed sections that mate together at shrouds (or side sections) provided around their respective perimeters and include a plurality of propulsion motors or propellers therein. The meshed sections may feature segmented holes or other openings that are sized to maximize air flow therethrough and to protect against the unwanted or unintended insertion of fingers or other body parts or objects into such holes or openings, which may cause damage to the motors or propellers, or result in one or more injuries. The housings or bodies of the aerial vehicles may further include landing pegs, struts, "feet," or other extensions or appurtenances that enable the aerial vehicles to land on any substantially flat surface, or aid in guiding the aerial vehicle into a dock or another system having holes or other openings corresponding to geometries of the extensions or appurtenances.

The aerial vehicles of the present disclosure may thus conduct any number of operations or evolutions within indoor spaces and safely capture information or data regarding conditions within such spaces while reducing a risk of injury to persons or other animals within such spaces. For example, one or more of the aerial vehicles disclosed herein may identify, or to confirm or verify, the existence or presence of any events or conditions within indoor spaces, e.g., any hazardous, abnormal or undesirable events or conditions, or evaluate the spaces regularly or periodically, or at scheduled or random times.

Figure 1A:
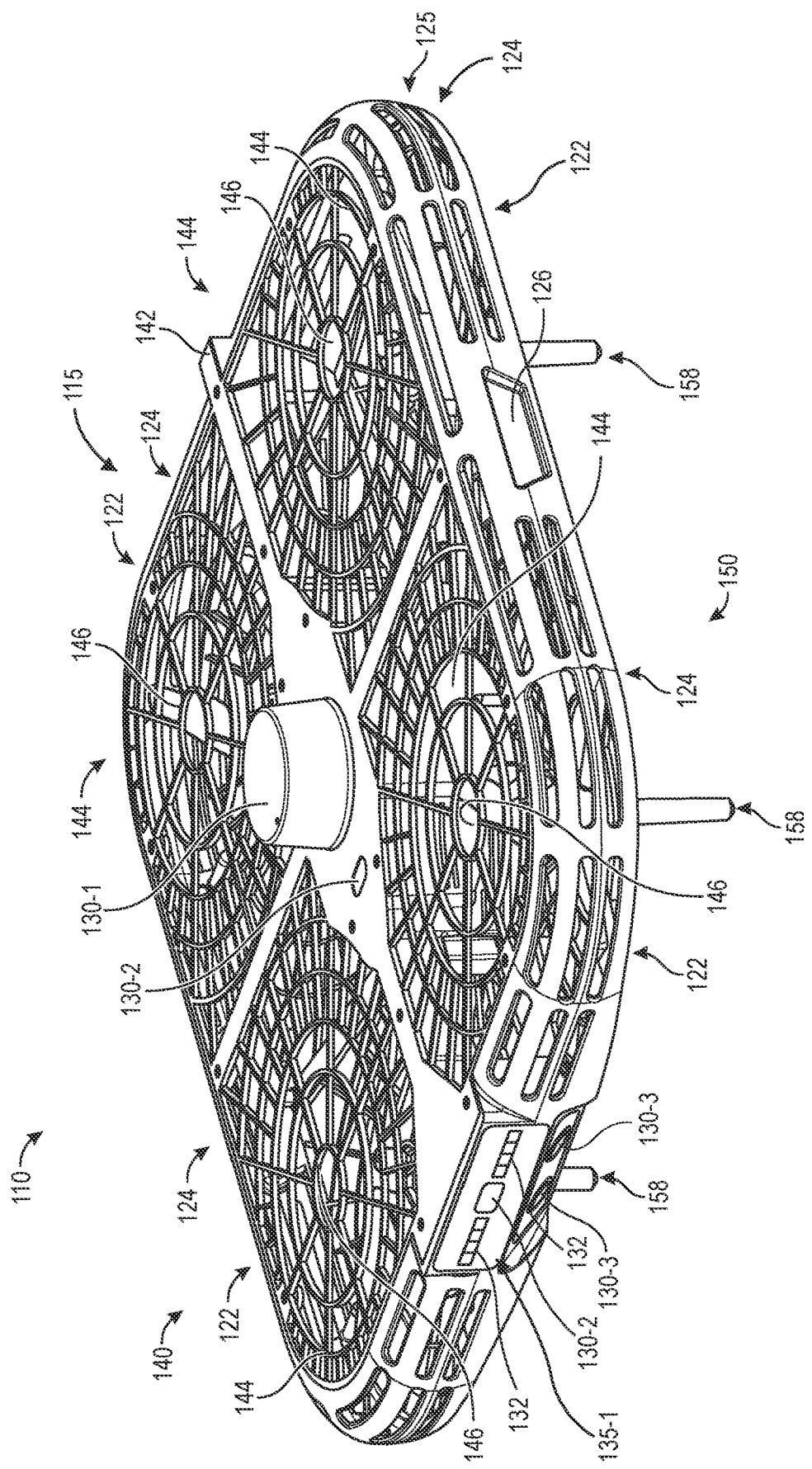
FIGS. 1A and 1B are views of aspects of one aerial vehicle in accordance with embodiments of the present disclosure.
Figure 1B:
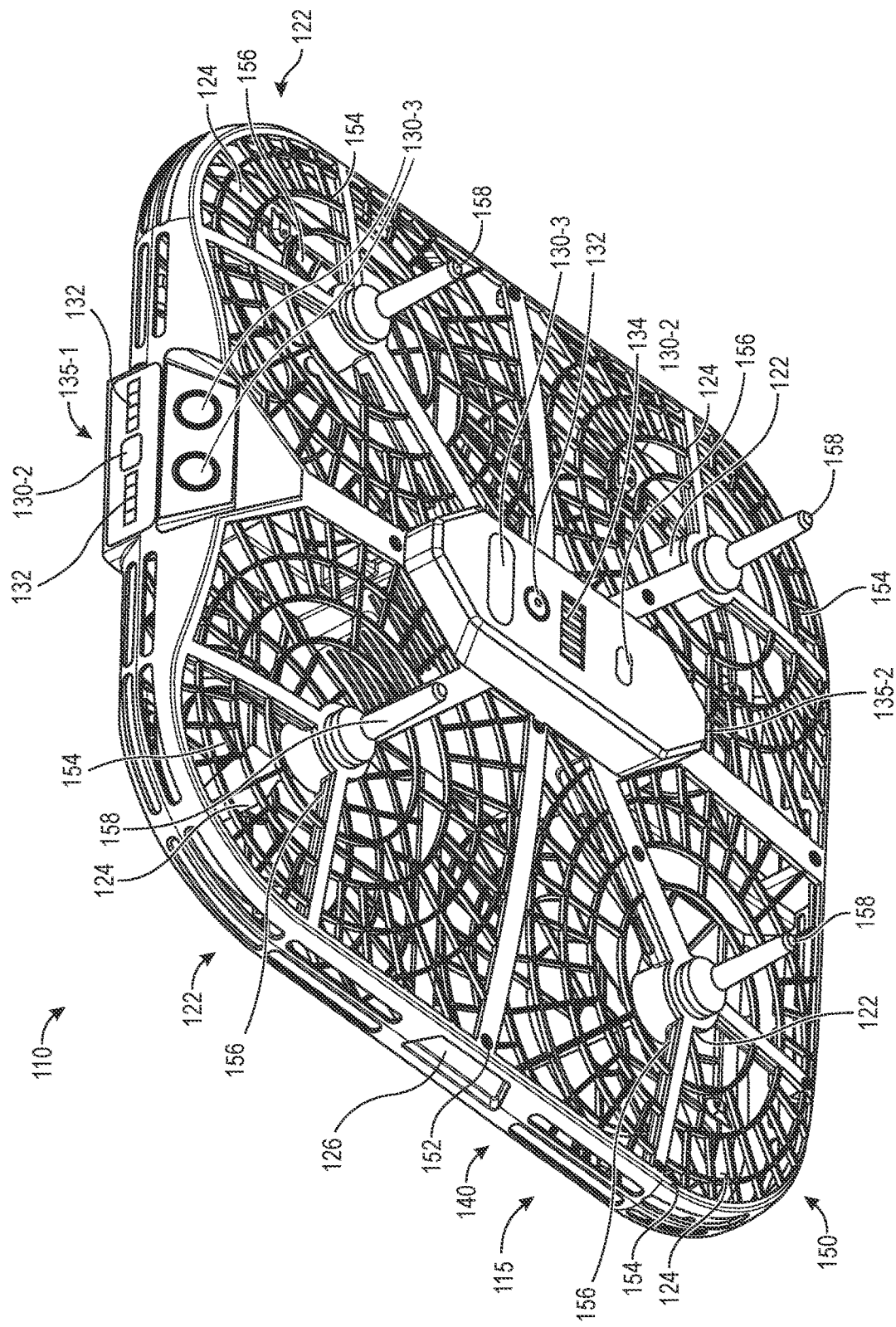

Referring to FIGS. 1A and 1B, views of aspects of one aerial vehicle 110 in accordance with embodiments of the present disclosure are shown. FIG. 1A is an upper perspective view of the aerial vehicle 110. FIG. 1B is a lower perspective view of the aerial vehicle 110.

The aerial vehicle 110 includes a housing 115 having an upper section 140 and a lower section 150 that mate together at a shroud (or a side section) 125 provided around a perimeter of the aerial vehicle 110. The aerial vehicle 110 further includes a plurality of chambers, viz., a first chamber 135-1 and a second chamber 135-2, for accommodating one or more other sensors, control systems, processors, circuitry or other components.

The upper section 140 and the lower section 150 define a cavity or an enclosure having a plurality of propulsion motors 122 disposed therein. Each of the propulsion motors 122 is mounted to an arm or another extension of the second chamber 135-2. The propulsion motors 122 may be powered by electricity or any other fuel source or prime mover, and each of the propulsion motors 122 is coupled to a propeller 124. The propulsion motors 122 may be capable of generating sufficient rotational speeds of the propellers 124 or other components to provide thrust and/or lift forces to the aerial vehicle 110 and any payload engaged thereby. Moreover, in some implementations, the propeller 124 may be formed from a single-piece construction, and with rigid blades of fixed dimensions. Alternatively, in some other implementations, the propeller 124 may have a foldable construction defined by one or more hinges, such that the propeller 124 may be folded into a reduced length or size when the propeller 124 is not rotating under power, or extended to a full length or size when operating under power. Furthermore, where the propeller 124 has a foldable construction, e.g., with blades having one or more hinges, in the event that an object contacts the propeller 124 during operation, the propeller 124 may deflect or fold in response to contact with the object. Such hinges may be provided at or near a hub of the propeller 124, or at any other location along the blades of the propeller 124.

As is shown in FIGS. 1A and 1B, the housing 115 has a substantially square cross-section, e.g., a substantially planar cross-section in the shape of a square with rounded corners or edges, or a squircle, with a substantially constant height. Moreover, as is further shown in FIGS. 1A and 1B, a length and a width of the housing 115 are each substantially greater than a height of the housing 115. In some implementations, a ratio of the length or the width of the housing 115 to the height of the housing 115 may be approximately six-to-1, or 6:1. For example, in some implementations, the housing 115 may have a length and a width of approximately twenty-five centimeters, or approximately twelve inches, and a height of approximately five centimeters, or approximately two inches. Alternatively, the housing 115 may have cross-sections of any other shape or size, e.g., cross-sections of any other sizes or shapes, e.g., rectangles other than squares, triangles, or any other polygons, or circles or any other curvilinear shapes, and may have any dimensions.

As is shown in FIGS. 1A and 1B, each of the upper section 140, the lower section 150 and the shroud 125 has a meshed or mesh-like construction, e.g., with a plurality of slats aligned longitudinally about a perimeter of the shroud 125, to reduce an overall mass of the aerial vehicle 110. The upper section 140 includes an upper frame 142 having a plurality of upper mesh sections 144 (or upper meshes) mounted thereto. The upper frame 142 has a cross-shaped construction with a pair of members aligned orthogonally with respect to one another and joined near a geometric center of the housing 115.

As is shown in FIG. 1A, the upper mesh sections 144 may each be defined by a radially oriented lattice structure that includes a central opening 146 defined by an inner ring or another circular object. Each of the upper mesh sections 144 further includes a plurality of spokes extending radially outward from the central opening 146, as well as a plurality of other concentric rings having radii that are progressively larger than the central opening 146. The spokes may have any angular separation from one another, e.g., forty-five degrees, or any fraction thereof, e.g., one-fourth of forty-five degrees. Moreover, the central opening 146 and the other concentric rings may have any radii or diameters. For example, in some implementations, the central opening 146 may have a diameter of approximately one to two centimeters (1-2 cm), and the concentric rings may have progressively larger radii, e.g., approximately nine to ten millimeters (9-10 mm) from the inner ring defining the central opening 146 or one another in a radial direction.

The inner ring defining the central opening 146, the spokes or the other concentric rings may have cross-sections of any other shape or size, e.g., squares, rectangles, circles or others, and may have any dimensions, such as widths or diameters of one to one-and-one-half millimeters (1-1.5 mm) each, and any lengths.

The upper section 140 includes four upper mesh sections 144, each of which is provided over one of the propulsion motors 122, and joined or otherwise mounted to the upper frame 142 by any number of clips, screws, bolts, snap-fit connections, or any other features. As is further shown in FIG. 1A, when the upper mesh sections 144 are mounted to the upper frame 142, the central openings 146 of each of the upper mesh sections 144 is coaxially aligned over one of the propulsion motors 122.

The lower section 150 has a cross-shaped construction with a pair of members aligned orthogonally with respect to one another and joined near a geometric center of the housing 115. A portion of the second chamber 135-2 extends through the lower section 150, aligned approximately at or near a geometric center of the housing 115.

The lower section 150 also includes a lower frame 152, a plurality of lower mesh sections 154 (or lower meshes) mounted to the lower frame 152, and a plurality of landing pegs (or struts, or feet) 158. As is shown in FIG. 1B, the lower mesh sections 154 may each be defined by a radially oriented lattice structure that includes a central opening 156 defined by an inner ring or another circular object. Each of the lower mesh sections 154 further includes a plurality of spokes extending radially outward from the central opening 156, as well as a plurality of other concentric rings having radii that are progressively larger than the central opening 156. The spokes may have any angular separation from one another, e.g., forty-five degrees, or any fraction thereof, e.g., one-fourth of forty-five degrees.

Moreover, the central opening 156 and the other concentric rings may have any radii or diameters. For example, in some implementations, the central opening 156 may have a diameter of approximately one to two centimeters (1-2 cm), and the concentric rings may have progressively larger radii, e.g., approximately nine to ten millimeters (9-10 mm) from the inner ring defining the central opening 156 or one another in a radial direction.

The inner ring defining the central opening 156, the spokes or the other concentric rings may have cross-sections of any other shape or size, e.g., squares, rectangles, circles or others, and may have any dimensions, such as widths or diameters of one to one-and-one-half millimeters (1-1.5 mm) each, and any lengths.

The lower section 150 includes four lower mesh sections 154, each of which is provided below one of the propulsion motors 122, and joined or otherwise mounted to the lower frame 152 or arms of the second chamber 135-2 to which the propulsion motors 122 are mounted by any number of screws or other fasteners. As is further shown in FIG. 1B, when the lower mesh sections 154 are mounted to the lower frame 152, the central openings 156 of each of the lower mesh sections 154 are coaxially aligned below one of the propulsion motors 122.

As is shown in FIGS. 1A and 1B, the inner rings defining the central openings 156 of each of the lower mesh sections 154 have diameters that are substantially larger than the inner rings defining the central openings 146 of each of the upper mesh sections 144. For example, the central opening 156 may have a diameter of approximately two to four centimeters (2-4 cm), or approximately twice a diameter of the central openings 146, and the concentric rings of the lower mesh sections 154 may have progressively larger diameters.

The landing pegs 158 may be any extensions or appurtenances extending below the lower section 150 that enable the aerial vehicle 110 to complete a landing evolution on any substantially flat surface. For example, the landing pegs 158 may have lengths that extend below a lowest point of the second chamber 135-2 beneath the lower section 150 of the housing, and ends that are aligned in a common plane, such that the aerial vehicle 110 may land on a substantially flat landing surface with each of the ends of the landing pegs 158 in contact with the landing surface, and without requiring the second chamber 135-2 to contact the landing surface. The landing pegs 158 may also assist or guide the aerial vehicle 110 when landing into or onto a docking station (e.g., a dock) or other system. For example, in some implementations, a docking station may include one or more portions having holes or other openings that correspond to or may accommodate the extensions or appurtenances therein.

The landing pegs 158 may be constructed and coupled to the housing 115 in any manner. For example, in some implementations, the landing pegs 158 may be discrete components that are fastened or otherwise joined or affixed to undersides of support members of the lower frame 152, or to undersides of respective ones of the lower mesh sections 154. Alternatively, the landing pegs 158 may be formed as integral parts of the lower mesh sections 154, the arms of the second chamber 135-2 to which the propulsion motors 122 are joined, or to undersides of the propulsion motors 122 themselves, and extend downward therefrom along common rotational axes of shafts or other portions of the propulsion motors 122, or in any other location or orientation with respect to any aspects of the propulsion motors 122.

The shroud 125 may be a single component, or a plurality of components, provided about a perimeter of the housing 115, and which joins the upper section 140 and the lower section 150 to form the housing 115. The shroud 125 may have a shape that generally defines the shape of the cross-section of the housing 115, e.g., a rounded square, or a squircle. As is shown in FIGS. 1A and 1B, the shroud 125 may be formed with a meshed or mesh-like construction, with one or more perforations, holes or other openings that may reduce an overall mass of the shroud 125. Alternatively, the shroud 125 may be formed with a substantially solid construction, e.g., without any perforations, holes or other openings.

The shroud 125 further includes a pair of indentations 126 on opposite sides of the aerial vehicle 110. The indentations 126 may be sized and oriented to accommodate one or more fingers of a hand, thereby enabling a human operator to hand-carry or otherwise manually transport the aerial vehicle 110 by grasping the shroud 125 and inserting one or more fingers into each of the indentations 126.

Although the aerial vehicle 110 of FIGS. 1A and 1B includes only a pair of indentations 126, aerial vehicles may include any number of indentations or other openings for manually transporting the aerial vehicles in accordance with implementations of the present disclosure, and such indentations may have any shape or size.

As is shown in FIG. 1A, the aerial vehicle 110 also includes a LIDAR sensor 130-1 (or a LIDAR sensor module) having a portion that extends above the housing 115, e.g., through a substantially circular hole (or bore, or other opening) at a geometric center or centroid, thereby enabling the upper frame 142 to be placed over the LIDAR sensor 130-1 and coupled to the shroud 125 or the lower section 150, with the hole or other opening encircled around or surrounding a circumference of the LIDAR sensor 130-1 in the upper frame 142.

In some implementations, the LIDAR sensor 130-1 may be configured to calculate distances to objects at an angular range of up to three hundred sixty degrees about the LIDAR sensor 130-1, and at any maximum measuring radius, e.g., twelve meters (12 m) or more. For example, in some implementations, the LIDAR sensor 130-1 may be configured to transmit light at any measurement frequency, e.g., up to 4,500 Hertz (or 4,500 measurements per second), and the transmitted light may be infrared light, or light at any other wavelength or frequency. In some implementations, the LIDAR sensor 130-1 may transmit light in a single direction, and capture or receive reflections of the light from one or more objects. In some other implementations, the LIDAR sensor 130-1 may be configured to transmit light along a first axis, e.g., normal to a yaw axis of the aerial vehicle 110, and to rotate the first axis about a second axis, e.g., along or parallel to the yaw axis of the aerial vehicle 110.

A difference between a time at which light is transmitted, and a time at which reflections of the light are received, is commonly called a "time-of-flight," and may be used with the speed of light to calculate distances to objects from which the light was reflected. In some implementations, the LIDAR sensor 130-1 may be configured to emit light at a wavelength of approximately 905 nanometers, e.g., within an infrared band, and at a power of approximately twenty-five milliwatts (25 mW). For example, the portion of the LIDAR sensor 130-1 extending above the housing 115 as shown in FIG. 1A may include one or more components for transmitting light, and one or more components for capturing reflections of the transmitted light.

The LIDAR sensor 130-1 may further combine distances calculated based on times-of-flight with information regarding angles at which the light was emitted and received to generate a point cloud or another representation of positions of objects, which may be stored by the aerial vehicle 110 and processed or transmitted to one or more external devices or systems for processing. The LIDAR sensor 130-1 may also include one or more motor drivers or other components for controlling a start, a stop or a speed of a motor, and may generate and transmit packets of data including any information regarding transmissions or returns, e.g., rotational speeds, start or end angles, time stamps, or other related data. Point clouds or other sets of distance or position information captured by the LIDAR sensor 130-1 may be utilized to construct an environment map (e.g., a physical map) of an indoor space in which the aerial vehicle 110 operates, or for any other purpose.

As is also shown in FIG. 1A, the aerial vehicle 110 also includes a time-of-flight sensor 130-2 having a field of view or orientation that extends normal to the upper frame 142 of the upper section 140, e.g., in a vertically upward direction above the aerial vehicle 110. The time-of-flight sensor 130-2 may be provided in association with the upper frame 142 or the second chamber 135-2, or another component or surface of the aerial vehicle 110, and configured to transmit light within a substantially pyramidal field of view having a fixed axis or direction relative to one or more principal axes of the aerial vehicle 110. The time-of-flight sensor 130-2 may transmit and receive light within the pyramidal field of view, which may be defined by any angle, e.g., approximately forty-five degrees, or any other angle. For example, in some implementations, the aerial vehicle 110 may interpret any received light in a map defined by a grid having a plurality of cells arranged in rows and columns, e.g., a grid of sixteen cells in four rows and four columns (or a 4×4 grid), or a grid of sixty-four cells in eight rows and eight columns (or an 8×8 grid), or any other numbers of rows and columns. Where the time-of-flight sensor 130-2 transmits light, and receives points (or returns or detections) of the transmitted light reflected off one or more surfaces, the aerial vehicle 110 may calculate a number of the points within any given cell of the cells of the grid, and calculate a confidence score in such points (or returns or detections). The numbers of points and the confidence scores may be calculated for each of such cells at any rate or frequency, e.g., ten hertz (10 Hz), one hundred hertz (100 Hz), or any other rate or frequency, based on points received by the time-of-flight sensor 130-2. Upon receiving data regarding one or more returns of reflections of the transmitted light, the time-of-flight sensor 130-2 may determine a distance to the object, based on an elapsed time between the transmission and the return, or in any other manner.

Either or both of the chambers 135-1, 135-2, or other portions of the aerial vehicle 110, may accommodate one or more other sensors, control systems, processors, circuitry or other components. For example, as is shown in FIGS. 1A and 1B, the first chamber 135-1 is provided at a first edge of the shroud 125. As is shown in FIG. 1B, the second chamber 135-2 is provided at a substantially central portion of the aerial vehicle 110, e.g., at an intersection of principal axes of the aerial vehicle 110, and includes a portion that extends beyond and below the lower section 150 of the housing. Alternatively, the aerial vehicle 110 may include any number of other chambers or other portions for accommodating one or more sensors, control systems, processors, circuitry or other components. Such chambers or portions may be provided in any location or orientation with respect to the housing 115 or the aerial vehicle 110 as a whole.

As is shown in FIGS. 1A and 1B, the first chamber 135-1 includes a number of components installed therein, and such components include features extending outward from one of a pair of substantially flat faces. For example, the first chamber 135-1 includes a time-of-flight sensor 130-2 (or a time-of-flight sensor module) having a field of view that extends normal from a substantially flat face and is aligned at an edge of the housing 115, e.g., radially outward from the shroud 125 and within a cross-section of the housing 115. Thus, when the aerial vehicle 110 travels in a direction such that the first chamber 135-1 is aligned forward of the aerial vehicle 110, the time-of-flight sensor 130-2 may capture data and determine ranges to objects forward of the aerial vehicle 110 based on the captured data in a manner similar to that described above with respect to the time-of-flight sensor 130-2 provided in association with the upper section 140 and described above.

The first chamber 135-1 also includes a pair of sets of illuminators 132, with each of the sets of illuminators 132 aligned in a common line and provided on opposite sides of the time-of-flight sensor 130-2. The sets of illuminators 132 may include one or more light-emitting diodes (or "LED"), incandescent bulbs, compact and/or linear fluorescent bulbs, halogen lamps, metal halide lamps, neon lamps, sodium lamps or any other type or form of lights configured to project visible light at any frequency, wavelength or intensity during operations of the aerial vehicle 110. For example, in some implementations, each of the sets of illuminators 132 may include a plurality of white lights. Alternatively, the sets of illuminators 132 may include one or more lights in colors other than white.

The first chamber 135-1 further includes a pair of cameras 130-3 (or camera modules, or other imaging devices of any type or form). For example, as is shown in FIG. 1B, the first chamber 135-1 includes two cameras 130-3 having fields of view with axes of orientation extending normal from another substantially flat face that is angled in a downward direction with respect to the housing 115, e.g., below the cross-section of the housing 115, or otherwise aligned at a non-parallel angle with respect to the other substantially flat face of the first chamber 135-1. Alternatively, either or both of the cameras 130-3 may be aligned with fields of view or axes of orientation extending in any direction or orientation with respect to the aerial vehicle 110, e.g., forward, aft, port, starboard, up, down, or in any other direction, or the yaw, pitch or roll axes of the aerial vehicle 110 vehicle, or at any other angle or orientation. The cameras 130-3 may be aligned with fixed orientations, or with variable orientations (e.g., rotating or shifting orientations).

Each of the cameras 130-3 may be configured to capture visual imaging data or depth imaging data with respect to objects or features that are present within their respective fields of view. In some implementations, depth imaging data captured by the cameras 130-3 may be interpreted to detect objects within an indoor space, to calculate distances or ranges to such objects, or to identify boundaries, edges or other features of such objects. In some implementations, visual imaging data captured by the cameras 130-3 may likewise be processed to identify or detect one or more boundaries or other features of objects, e.g., based on one or more edges, contours, outlines, colors, textures, silhouettes, shapes or other characteristics of objects depicted within the visual imaging data.

Depth imaging data and/or visual imaging data captured by either of the cameras 130-3 may be utilized for any purpose. In some implementations, the depth imaging data and/or visual imaging data may be processed to construct an environment map (e.g., a physical map) of an indoor space, or to select courses, speeds or altitudes for avoiding objects within the indoor space. In some implementations, the depth imaging data and/or visual imaging data may be processed to determine information regarding any events or conditions that may be occurring within an indoor space, or to identify such events or conditions. In some implementations, the depth imaging data and/or visual imaging data may be captured, processed or stored by one or more components of the aerial vehicle 110. In some other implementations, however, the depth imaging data and/or visual imaging data may be transmitted to one or more external systems that may be provided within an indoor space where the aerial vehicle 110 operates, or on or in one or more alternate or virtual locations, such as in a "cloud"-based environment.

In some implementations, the aerial vehicle 110 may have any number of cameras 130-3 or other imaging devices, and such cameras or imaging devise may be located on either face of the first chamber 135-1, or in any other location or orientation with respect to any principal axes of the aerial vehicle 110. In some implementations, imaging data captured by the cameras 130-3 in any location or orientation may be used for any purpose. For example, imaging data captured by either of the cameras 130-3 of the first chamber 135-1 may be utilized for visual-inertial odometry (or "VIO"), for monitoring or evaluating conditions within an indoor space, or for any other purpose. In some implementations, one or more of the cameras 130-3 may be an electronic shutter camera, a global shutter camera, a rolling shutter camera, or any other type or form of camera. In some implementations, imaging data captured by one or more of the cameras 130-3 may be continuously streamed to one or more external devices or systems, or processed and stored for any purpose.

Furthermore, in some implementations, the cameras 130-3 of the first chamber 135-1 may have fields of view that are generally oriented in a common direction and substantially overlap. In some implementations, one of the cameras 130-3 may be a visual camera (e.g., a color camera) that may be used to capture images that are encoded as video files and transmitted to a remote system for streaming to a user device. In some other implementations, one of the cameras 130-3 may be a global shutter visual graphics array (or "VGA") camera (e.g., a grayscale camera) having an infrared-cut filter, e.g., at 650 nanometers (or 650 nm), and a field of view of 166 degrees diagonal, 133 degrees horizontal, and 100 degrees vertical. Where one of the cameras 130-3 is a global shutter camera, the one of the cameras 130-3 may be configured to capture image frames at a rate of approximately thirty frames per second (or 30 fps), and such images may be used by the aerial vehicle 110 for visual simultaneous localization and mapping (or "SLAM"), or for any other purpose.

As is shown in FIG. 1B, the second chamber 135-2 includes a plurality of other sensors, including another time-of-flight sensor 130-2 and another camera 130-3, as well as one or more illuminators 132 (e.g., lights) and one or more charging contacts 134.

Each of the time-of-flight sensor 130-2 and the camera 130-3 of the second chamber 135-2 is aligned in a vertically downward direction, e.g., with fields of view or axes of orientation that are parallel to or coaligned with a yaw axis of the aerial vehicle 110. Each of the time-of-flight sensor 130-2 and the camera 130-3 of the second chamber 135-2 is further configured to capture and interpret data in manners consistent with the descriptions of the other time-of-flight sensors 130-2 or cameras 130-3 set forth above. Furthermore, data captured by the time-of-flight sensor 130-2 or the camera 130-3 of the second chamber 135-2 may be interpreted and utilized for any purpose, such as to construct an environment map (e.g., a physical map), to guide the aerial vehicle 110 during landing evolutions, to determine information regarding any events or conditions that may be occurring within an indoor space, to identify such events or conditions, or for any other purpose.

Alternatively, one or more of the time-of-flight sensors 130-2 may be a single-point sensor that is configured to transmit light and capture reflections of the light to calculate a distance to a single point, rather than distances to points in multiple cells of a grid.

In accordance with one or more implementations, the time-of-flight sensor 130-2 of the second chamber 135-2 may be a one-dimensional time-of-flight sensor. In accordance with one or more other implementations, other time-of-flight sensors of the aerial vehicle 110, e.g., the time-of-flight sensor 130-2 of the first chamber 135-1, may instead configured to generate measurements of distances to points within multiple cells of a grid representing their respective fields of view, e.g., a grid of sixteen cells in four rows and four columns (or a 4×4 grid), or a grid of sixty-four cells in eight rows and eight columns (or an 8×8 grid), or any other numbers of rows and columns. Alternatively, in some implementations, each of the time-of-flight sensors 130-2 of the aerial vehicle 110 may be one-dimensional time-of-flight sensors, or time-of-flight sensors that are configured to generate measurements of distances to points within multiple cells of a grid.

In accordance with one or more implementations, the camera 130-3 of the second chamber 135-2 may be a global shutter VGA camera without an infrared-cut filter, e.g., infrared sensitive at 650 to 1100 nanometers (or 650-1100 nm) and a field of view of 166 degrees diagonal, 133 degrees horizontal, and 100 degrees vertical, configured to capture image frames at a rate of approximately thirty frames per second (or 30 fps). Alternatively, the camera 130-3 of the second chamber 135-2 may be any other type of camera, and may have any other attributes or features. Images captured by the camera 130-3 of the second chamber 135-2 may be used by the aerial vehicle 110 for visual simultaneous localization and mapping (or "SLAM"), docking, or for any other purpose.

As is also shown in FIG. 1B, the illuminators 132 of the aerial vehicle 110 may be one or more LEDs, incandescent bulbs, compact and/or linear fluorescent bulbs, halogen lamps, metal halide lamps, neon lamps, sodium lamps or any other type or form of lights configured to project light at any frequency, wavelength or intensity during operations of the aerial vehicle 110. The charging contacts 134 may be any components or surfaces that are aligned to come into contact with corresponding charging contacts of a docking station, a base component or any other system, thereby enabling electrical power, information or data to be conveyed between the aerial vehicle and the docking station, the base component or the other system.

In addition to the LIDAR sensor 130-1, the time-of-flight sensors 130-2 and the cameras 130-3 of the first chamber 135-1 and the second chamber 135-2, the aerial vehicle 110 may further include any type or form of other sensors, or any number of such sensors. For example, in some implementations, the aerial vehicle 110 may include one or more ultrasonic sensors (or an ultrasonic sensor module) that are configured to transmit sound waves or pulses within an indoor space from the substantially flat face of the first chamber 135-1 that is aligned parallel to the yaw axis of the aerial vehicle 110, from the substantially flat face of the second chamber 135-2 that is aligned normal to the yaw axis of the aerial vehicle 110, or from any other surfaces. Reflections of sound waves or pulses transmitted by the ultrasonic sensors within the indoor space may be captured and interpreted to calculate distances or directions from the aerial vehicle 110 to one or more objects within the indoor space based on times at which the sound waves or pulses were transmitted and received, and the speed of sound within the indoor space.

The various components of the housing 115, including but not limited to the upper section 140, the lower section 150, the chambers 135-1, 135-2, the landing pegs 158 or others may be formed from any suitable materials, such as plastics (e.g., thermosetting plastics such as epoxy or phenolic resins, polyurethanes or polyesters, as well as polyethylenes, polypropylenes or polyvinyl chlorides, and also recycled plastics), wood (e.g., woods with sufficient strength properties such as ash), metals (e.g., lightweight metals such as aluminum, or metals of heavier weights including alloys of steel), composites (e.g., carbon fiber), rubbers, or any other combinations of materials.

For example, in some embodiments, the upper section 140, the lower section 150, the chambers 135-1, 135-2, the landing pegs 158 or others may be formed from polycarbonates, acrylonitrile butadiene styrene (or "ABS"), a blend of polycarbonates and ABS, or any other suitable materials, e.g., plastic, wood, metal, composites, carbon fibers, rubbers, or any other suitable materials. The upper section 140, the lower section 150, the chambers 135-1, 135-2, the landing pegs 158 or others may be further formed from any number of portions, pieces or sections, such as one, two (viz., the upper section 140 or the lower section 150), or more.

The aerial vehicle 110 may further include any number of processors, memory components or data stores, transceivers, or other processor-driven equipment (not shown), which may be maintained or stored within either the first chamber 135-1, the second chamber 135-2, or any other portion of the aerial vehicle 110. The aerial vehicle 110 may be configured for communication via any number of wireless systems or protocols, including but not limited to wireless fidelity ("Wi-Fi"), Bluetooth, radio frequency identification (or "RFID"), near-field communication (or "NFC") readers, or any other type of systems or protocols.

In some implementations, aerial vehicles of the present disclosure may be programmed or configured to generate one or more environment maps of indoor spaces within a facility, based on images or other data captured by one or more sensors, e.g., the sensors 130-1, 130-2, 130-3. An environment map may identify or depict one or more boundaries (e.g., walls, ceilings, floors) or other aspects of indoor spaces, as well as the respective dimensions of such spaces, or the respective surfaces or textures of such boundaries. In some embodiments, an aerial vehicle may autonomously travel throughout an indoor space in order to capture data using one or more sensors, and such data may be utilized in generating an environment map of the indoor space. In some other embodiments, the aerial vehicle may be transported (e.g., carried) or escorted by a human actor throughout an indoor space, and may capture data using one or more sensors as the aerial vehicle is transported or escorted throughout the indoor space. Data captured as the aerial vehicle is escorted may be utilized in generating an environment map of the indoor space. Additionally, in some embodiments, the aerial vehicle may selectively operate one or more propulsion motors as the aerial vehicle is transported or otherwise escorted throughout an indoor space, in order to maintain altitude and/or tilt control. Furthermore, in some embodiments, data captured by the aerial vehicle as the aerial vehicle travels throughout the indoor space may be adjusted to account for presence of one or more body parts of a human actor that is transporting or otherwise escorting the aerial vehicle through the indoor space. Additionally, an environment map generated based on data captured using one or more sensors of an aerial vehicle may further include one or more layers identifying locations of utilities, services or other systems within an indoor space.

Aerial vehicles of the present disclosure may be configured to operate any access-related systems within an indoor space, including any portals or other systems, or to enable communication with persons within an indoor space via one or more secure communications channels (e.g., voice, video and/or data). In some embodiments, an aerial vehicle may be programmed or instructed to automatically open a door or other entry point in a home, an office or another structure (e.g., a private dwelling or business location), to access a public garage or other parking or standing area, or to activate an indication within an indoor space. For example, an aerial vehicle may be configured to transmit wireless codes, signals or other information to trigger a response from one or more devices or machines equipped with wireless transceivers, such as garage door openers, doorbells, lights, haptic feedback systems or other machines or devices. Aerial vehicles may also be configured to share any relevant information or data with persons, while preventing such persons from accessing any other sensitive information or data within the indoor space. Aerial vehicles may be further configured to communicate with any other vehicles or systems within an indoor space, including but not limited to cleaning robots, servicing robots, domestic robots, household robots, monitoring and/or surveillance robots, or robots of any other kind, e.g., to provide one or more instructions for performing one or more tasks within the indoor space.

In accordance with some embodiments of the present disclosure, an aerial vehicle may be configured to operate along with one or more docking stations, e.g., base components, charging docks (or charging stations or docking stations), or other intermediary devices. Such stations may have openings, cavities or spaces configured to accommodate one or more portions of an aerial vehicle, and may include one or more surfaces that are aligned to come into contact with corresponding surfaces of the aerial vehicle, thereby enabling electrical power, information or data to be conveyed between the aerial vehicle and such stations. In some embodiments, a base component, a charging dock, or another intermediary device may include an opening, a cavity or another space that is sized and shaped to receive or accommodate a specific portion of an aerial vehicle, e.g., a fuselage of the aerial vehicle, and to enable the aerial vehicle to be aligned in one of a plurality of alignments or orientations with respect to the base component, the charging dock or intermediary device.

For example, in some embodiments, an aerial vehicle may also include one or more contacts that are positioned or aligned in an arrangement or pattern on an external surface of a portion of the aerial vehicle, e.g., a fuselage of the aerial vehicle, that is designed to contact corresponding portions of a base component, a charging dock or another intermediary device. One or more internal surfaces of the base component, the charging dock or the intermediary device may include contacts that are positioned or aligned in an arrangement or pattern that is consistent with arrangements or patterns of contacts on external surfaces of an aerial vehicle, such that the contacts on the external surface of the portion of the aerial vehicle and the contacts on the one or more internal surfaces of the base component, the charging dock or the intermediary device mate or otherwise come into contact with one another when the portion of the aerial vehicle is in one of a plurality of predetermined alignments or orientations.

In some embodiments, an aerial vehicle may include one or more cameras or other optical sensors having fields of view that extend below the aerial vehicle and are aligned to capture imaging data while the aerial vehicle executes one or more landing evolutions. Thus, when the portion of the aerial vehicle attempts to land on a docking station or at another location, such cameras or other optical sensors may be used to guide the aerial vehicle onto the docking station or another landing surface.

Moreover, aerial vehicles of the present disclosure may be configured for use or operation within indoor spaces or facilities of any kind. As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks).

In some implementations, the aerial vehicles of the present disclosure may be dispatched or otherwise instructed to travel to one or more locations, to capture images or other data in such locations, and to determine whether a predetermined event or condition (e.g., an alarm event or condition) is occurring or has occurred at the one or more locations. In some embodiments, the aerial vehicles may be dispatched or instructed to travel to such locations directly, e.g., in response to one or more sets of instructions received from an external computer device over one or more networks.

The aerial vehicles of the present disclosure may take any action in response to determining that one or more sensors has detected a predetermined event or condition, or upon processing or otherwise analyzing data captured from one or more spaces within a facility. For example, an aerial vehicle may affirmatively determine, e.g., to various levels of confidence, that a predetermined event or condition has occurred in one or more spaces within a facility or, alternatively, that the predetermined event or condition has not occurred in such spaces. Alternatively, the aerial vehicles of the present disclosure may transmit images or other data captured from such spaces to one or more external computer devices or systems, such as a base component or other station configured to charge the aerial vehicles with electrical power (e.g., a base component, a charging dock, or another intermediary device or system) within the facility or, alternatively, to a server or other computer device or system provided in one or more alternate or virtual locations, e.g., in a "cloud"-based environment. The images or other data may be transmitted independently or along with one or more measures of a level of confidence (e.g., a confidence score) as to whether a predetermined event or condition has occurred or is present within the one or more spaces. Subsequently, the external computer device or system may make a determination, based on the images or other data, or any other data captured by one or more sensors present within such spaces or in any other location, whether a predetermined event or condition has occurred or is present within such spaces, or whether the predetermined event or condition has not occurred or is not present in such spaces.

Moreover, upon determining that a predetermined event or condition has occurred or is present within one or more spaces of a facility, an aerial vehicle of the present disclosure, or a base component, a charging dock or another intermediary device in communication with the aerial vehicle, may transmit one or more requests or sets of instructions requesting additional resources at such spaces to one or more external computer devices or systems.

Figure 2:
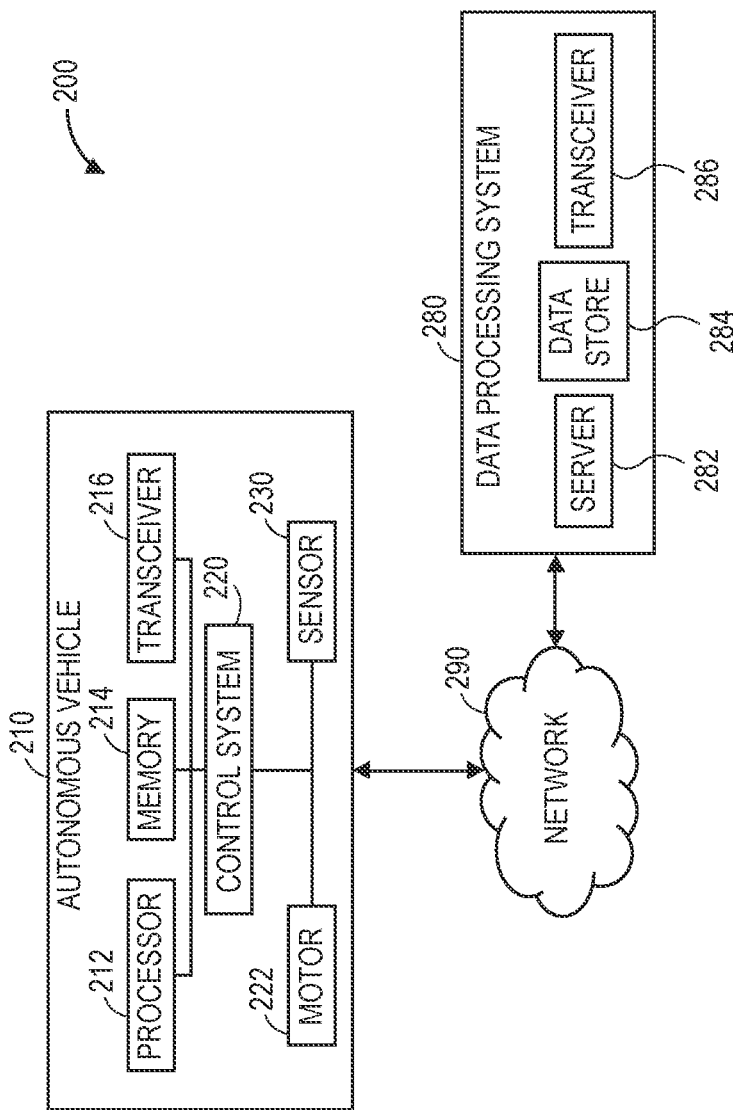
FIG. 2 is a block diagram of one system including an aerial vehicle in accordance with embodiments of the present disclosure.

Referring to FIG. 2, a block diagram of components of one system including an aerial vehicle in accordance with embodiments of the present disclosure is shown. The system 200 includes the aerial vehicle 210 and a data processing system 280 that are connected to one another across a network 290, which may include the Internet in whole or in part. Except where otherwise noted, reference numerals preceded by the number "2" shown in FIG. 2 refer to elements that are similar to elements having reference numerals preceded by the number "1" shown in FIGS. 1A and 1B.

The aerial vehicle 210 may be any type or form of aerial vehicle (e.g., an unmanned aerial vehicle, or drone) that may be programmed or configured to autonomously perform one or more operations within indoor spaces of a facility. As is shown in FIG. 2, the aerial vehicle 210 includes a processor 212, a memory 214 and a transceiver 216. The aerial vehicle 210 further includes a control system 220, one or more motors 222, and one or more sensors 230.

The processor 212 may be configured to perform any type or form of computing function associated with the operation of the aerial vehicle 210. For example, the processor 212 may be configured to execute any other algorithms or techniques (e.g., machine learning systems or techniques) associated with one or more applications, purposes or functions, such as navigation, monitoring or collision avoidance, or to select at least one of a course, a speed or an altitude for the safe operation of the aerial vehicle 210. The processor 212 may be configured to control any aspects of the operation of the aerial vehicle 210 and any computer-based components thereon, including but not limited to the motors 222 or the sensors 230. For example, the processor 212 may control the operation of one or more control systems or modules, such as the control system 220, for generating instructions for conducting operations of one or more of the motors 222 or the sensors 230. Such control systems or modules may be associated with one or more other computing devices or machines, and may communicate with the data processing system 280 or one or more other computer devices over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, paths or routes, control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), non-volatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols or standards such as Bluetooth or any Wi-Fi protocol, over the network 290 or directly. The transceiver 216 may further include or be in communication with one or more input/output (or "I/O") interfaces, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the control system 220, or the motors 222 or sensors 230. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the motors 222, e.g., to cause one or more of the motors 222 to operate at desired speeds, in order to guide the aerial vehicle 210 along a desired course, at a desired speed, or at a desired altitude, as appropriate. The control system 220 may further control any other aspects of the aerial vehicle 210, including but not limited to the operation of one or more steering or braking systems of a ground vehicle, or one or more control surfaces such as wings, rudders, flaperons, elevons, elevators, ailerons, flaps, brakes or slats of an aerial vehicle, within desired ranges. In some embodiments, the control system 220 may be integrated with one or more of the processor 212, the memory 214 and/or the transceiver 216.

The motors 222 may be any type or form of motor (e.g., electric, gasoline-powered or any other type of motor) capable of generating sufficient rotational speeds of one or more propellers or other components to provide thrust and/or lift forces to the aerial vehicle 210 and any payload engaged thereby. In some embodiments, one or more of the motors 222 may be a brushless direct current ("DC") multi-phase motor such as an outrunner brushless motor or an inrunner brushless motor.

The aerial vehicle 210 may include any number of such motors 222 of any kind. For example, one or more of the motors 222 may be aligned or configured to operate with different capacities or ratings, or at different speeds, or coupled to any number of propellers having different sizes and shapes. Additionally, one or more of the motors 222 may be an electric motor, e.g., a brushless DC multi-phase motor, and one or more of the motors 222 may be a gasoline-powered motor.

The aerial vehicle 210 may also include any number of sensors 230 or other components or other features for capturing data within a vicinity of the aerial vehicle 210, including but not limited to one or more imaging devices (e.g., digital cameras), range sensors (e.g., LIDAR sensors, time-of-flight sensors, ultrasonic sensors, or others), Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude sensors, depth gauges, accelerometers, or sound sensors (e.g., microphones, piezoelectric sensors, vibration sensors or other transducers for detecting and recording acoustic energy from one or more directions). For example, in some implementations, the aerial vehicle 210 may include two or more of such sensors 230 in an IMU or any other system.

Although the block diagram of FIG. 2 includes a single box corresponding to a motor 222 and a single box corresponding to a sensor 230, those of ordinary skill in the pertinent arts will recognize that the aerial vehicle 210 may include any number of motors 222 or sensors 230 in accordance with the present disclosure.

The data processing system 280 includes one or more physical computer servers 282 having one or more computer processors, one or more data stores (e.g., databases) 284, and any number of transceivers 286 associated therewith, as well as provided for any specific or general purpose. In some embodiments, the data processing system 280 of FIG. 2 may be independently provided for the exclusive purpose of receiving, analyzing or storing information or data received from the aerial vehicle 210 or, alternatively, provided in connection with one or more physical or virtual services configured to receive, analyze or store such information or data, as well as one or more other functions. In some other embodiments, the data processing system 280 may be associated with an electronic marketplace, a fulfillment center, a warehouse, a bricks-and-mortar retail establishment, or any other like facilities. Such facilities may be adapted to receive, store, process and/or distribute items, and may include any number of stations for receiving, storing and distributing items to customers, including but not limited to one or more receiving stations, storage areas and/or distribution stations, which may further include any number of associated servers, data stores, processors or like computer components. Alternatively, or additionally, in some embodiments, the data processing system 280 may be associated with any number of public or private authorities, such as police, fire or security personnel.

The servers 282 may be connected to or otherwise communicate with the data stores 284 and the transceivers 286, and may receive, analyze or store any type of information or data, e.g., imaging data, acoustic signals, environmental conditions, operational characteristics, or positions, or any other information or data, for any purpose. The servers 282 and/or the data stores 284 may also connect to or otherwise communicate with the network 290, through the sending and receiving of digital data. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more vehicles, including but not limited to the aerial vehicle 210.

Each of the transceivers 216, 286 or other communications devices, systems or components may be configured to communicate through one or more wired or wireless means, e.g., wired technologies such as Universal Serial Bus (or "USB") or fiber optic cable, or wireless standards or protocols such as Bluetooth or any Wi-Fi protocol, over the network 290 or directly. The transceivers 216, 286 may further include or be in communication with one or more I/O interfaces, network interfaces or devices, and may be configured to allow information or data to be exchanged between one another, or to or from one or more other computer devices or systems via the network 290.

The transceivers 216, 286 may perform any necessary protocol, timing or other data transformations in order to convert data signals from a first format suitable for use by one component into a second format suitable for use by another component. For example, in some embodiments, the transceivers 216, 286 may be configured to communicate according to one or more protocols traditionally associated with discrete components, e.g., within specific frequency spectra, including but not limited to radio frequency signals typically within ranges of approximately three hundred to four hundred megahertz, or MHz, as well as radio frequency signals typically within ranges of approximately three hundred to five hundred megahertz, or MHz.

In some embodiments, the transceivers 216, 286 may be configured to transmit or receive Bluetooth signals sent within an industrial, scientific and medical (ISM) radio frequency range of approximately 2.400 to approximately 2.500 gigahertz (GHz), with a center frequency of approximately 2.450 GHz. Such signals are typically sent within a particular range of approximately 2.402 to approximately 2.480 GHz, and have a maximum transmission rate on Bluetooth networks of 3 megabits per second (or 3 Mbps) or more, with a maximum transmission range of 10 to 100 meters or more, and at powers of approximately one milliwatt (mW), or 0.001 watts (W). The transceivers 216, 286 may operate according to a frequency-hopping spread spectrum (FHSS) method, e.g., by switching carriers across multiple frequency channels and transmitting communications in small segments, and in respective time slots. In some embodiments, such communications may be transmitted at approximately 1,600 times per second across 79 different subfrequencies at bandwidths of 0.001 GHz, or one megahertz (MHz) across the 2.402 to 2.480 GHz range.

In some embodiments, the transceivers 216, 286 may be configured to transmit or receive Ultra-Wide Band (or "UWB") signals over one or more broad spectrums within any radio frequency range. In some embodiments, the UWB signals may be transmitted and/or received over a range of approximately three to eleven gigahertz (GHz), or over a range of approximately four to six gigahertz (GHz), with a center frequency of approximately five gigahertz (GHz). Alternatively, the UWB signals may be transmitted over any frequency range, and with any center frequency. Additionally, the UWB signals may consist of billions of pluses transmitted across such frequency spectrums, and at various power levels or power densities.

In some embodiments, the transceivers 216, 286 may be configured to transmit or receive RFID signals at low frequency (LF), medium frequency (MF) or high frequency (HF) levels (e.g., approximately 3 kilohertz to 30 megahertz, or 3 kHz-30 MHz) and transfer relatively small-sized sets or packets of data over short ranges (e.g., between one and one hundred centimeters, or 1-100 cm). In some other embodiments, the transceivers 216, 286 may be configured to transmit or receive RFID signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

Alternatively, the transceivers 216, 286 may be configured to communicate within customized frequency spectra, or at dynamic frequencies, in accordance with the present disclosure. For example, in some embodiments, one or more of the transceivers 216, 286 may be configured to communicate according to a proprietary standard or protocol, or within a proprietary frequency spectrum.

In some embodiments, the transceivers 216, 286 may include support for devices attached through various types of peripheral buses, e.g., variants of the Peripheral Component Interconnect (PCI) bus standard or the Universal Serial Bus (USB) standard. In some other embodiments, functions of the transceivers 216, 286 may be split into two or more separate components, or incorporated directly into one or more processors or other components.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein. Any combination of networks or communications protocols may be utilized in accordance with the systems and methods of the present disclosure. For example, the various components described herein may be configured to communicate via an open or standard protocol such as Wi-Fi. Alternatively, such components may be configured to communicate with one another directly outside of a centralized network, such as the network 290, e.g., by a wireless protocol such as Bluetooth, in which two or more of such components may be paired with one another.

The computers, servers, devices and the like described herein have the necessary electronics, software, memory, storage, databases, firmware, logic/state machines, microprocessors, communication links, displays or other visual or audio user interfaces, printing devices, and any other I/O devices to provide any of the functions or services described herein and/or achieve the results described herein. Also, those of ordinary skill in the pertinent arts will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages, social network messages, online marketplace messages, telephone calls or the like. For example, the aerial vehicle 210 and/or the data processing system 280 may be adapted to transmit information or data in the form of synchronous or asynchronous messages between or among themselves, or between or among any other computer device in real time or in near-real time, or in one or more offline processes, via the network 290. Those of ordinary skill in the pertinent arts would recognize that the aerial vehicle 210 and/or the data processing system 280 may operate any of a number of computing devices that are capable of communicating over the network, including but not limited to set-top boxes, personal digital assistants, digital media players, web pads, laptop computers, desktop computers, laptop computers, tablet computers, smartphones, smart speakers, wrist watches, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors 212 and/or the data processing system 280, or any other computers or control systems, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3A:
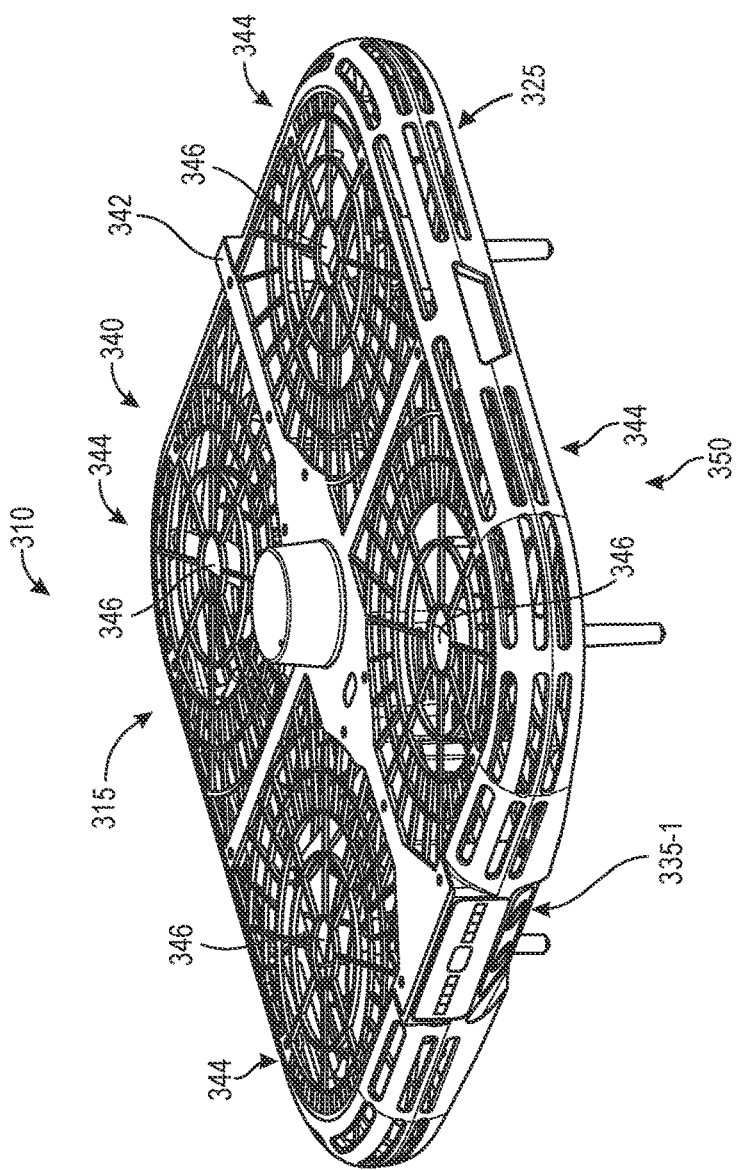
FIGS. 3A and 3B are views of aspects of one aerial vehicle in accordance with embodiments of the present disclosure.
Figure 3A:
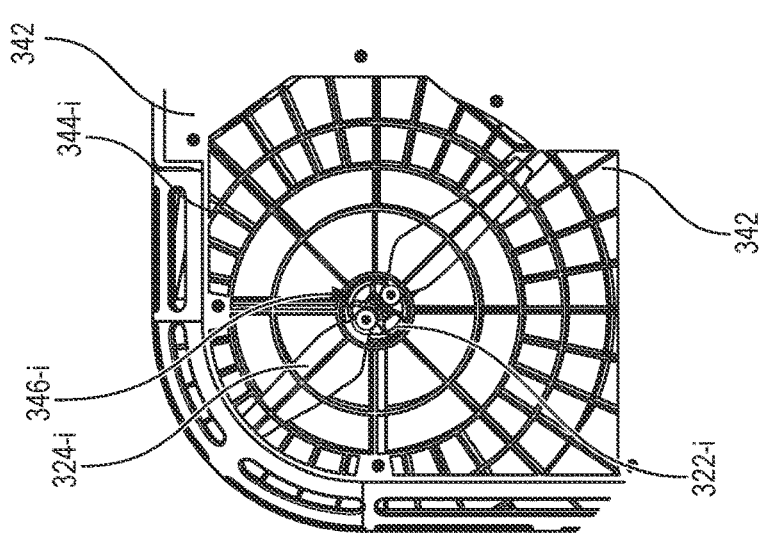
Figure 3B:
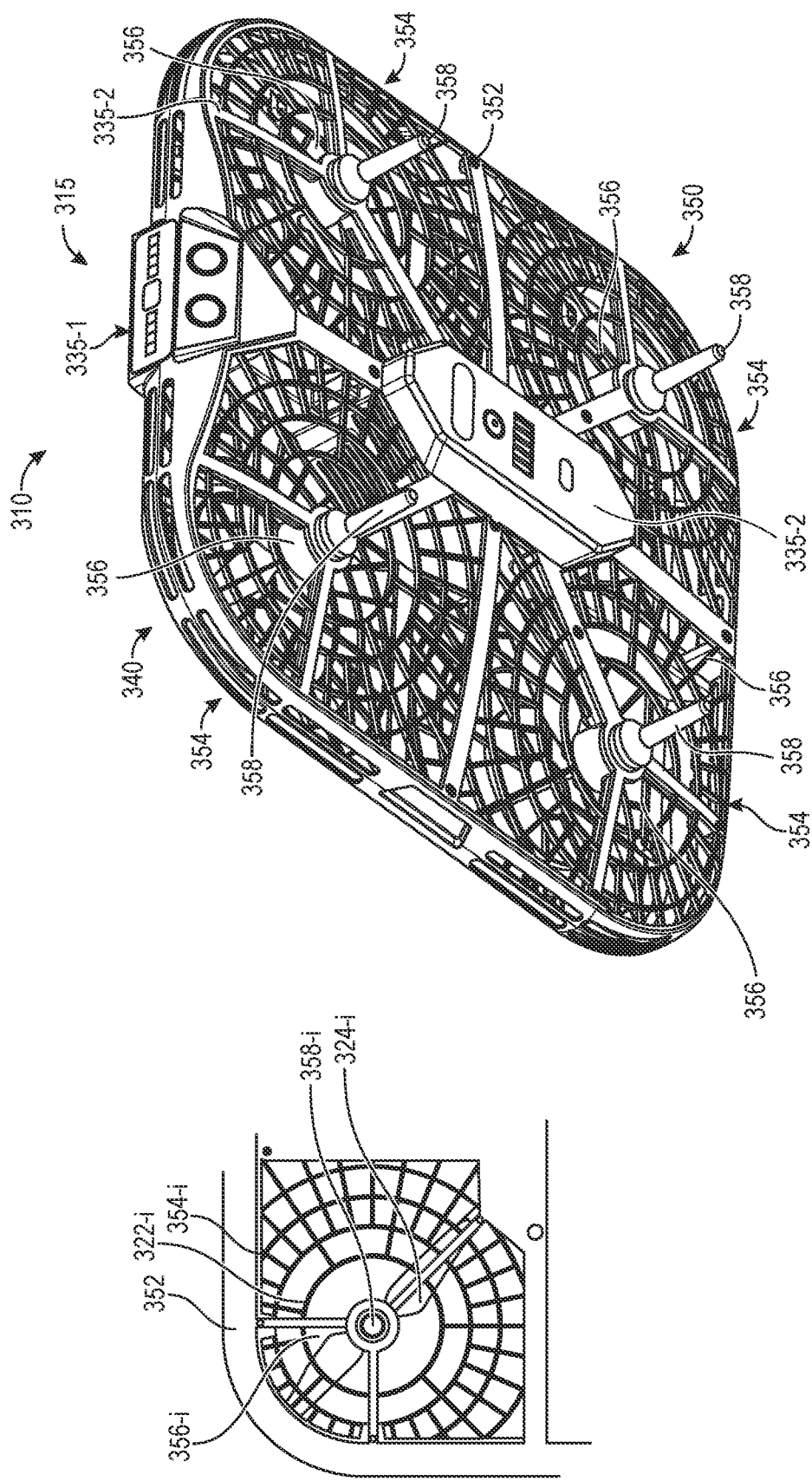

As is discussed above, housings of aerial vehicles of the present disclosure may be formed from sections having meshed or mesh-like constructions. Referring to FIGS. 3A and 3B, a view of an aerial vehicle in accordance with embodiments of the present disclosure is shown. Except where otherwise noted, reference numerals preceded by the number "3" shown in FIG. 3A or 3B refer to elements that are similar to elements having reference numerals preceded by the number "2" shown in FIG. 2, by the number "1" shown in FIGS. 1A and 1B.

As is shown in FIGS. 3A and 3B, an aerial vehicle 310 includes a housing 315 formed from a shroud (or a side section) 325, an upper section 340, a lower section 350. As is shown in FIG. 3A, the upper section 340 includes an upper frame 342 and plurality of upper mesh sections 344. As is further shown in FIG. 3A, a representative one of the upper mesh sections 344-$i$ includes an inner ring defining a central opening 346-$i$ and a plurality of spokes extending radially outward from the central opening 346-$i$, as well as a plurality of other concentric rings having radii that are progressively larger than the central opening 346-$i$. The inner ring of the upper mesh section 344-$i$ defining the central opening 346-$i$, the spokes or the other concentric rings may have cross-sections of any other shape or size, e.g., squares, rectangles, circles or others, and may have any dimensions, such as widths or diameters of one to two millimeters (1-2 mm) each, and any lengths. Moreover, the central opening 346-$i$ and the other concentric rings may have any radii or diameters. For example, in some implementations, the central opening 346-$i$ may have a diameter of approximately one to two centimeters (1-2 cm), and the concentric rings may have progressively larger diameters, e.g., approximately nine to ten millimeters (9-10 mm) from the inner ring defining the central opening 346-$i$ or one another in a radial direction. The spokes of the upper mesh section 344-$i$ may have any angular separation from one another, e.g., forty-five degrees, or any fraction thereof, e.g., one-fourth of forty-five degrees.

As is shown in FIG. 3B, the lower section 350 also includes a lower frame 352, a plurality of lower mesh sections 354 (or lower meshes) mounted to the lower frame 352, and a plurality of landing pegs (or struts, or feet) 358. As is further shown in FIG. 3B, a representative one of the lower mesh sections 354-$i$ may each be defined by a radially oriented lattice structure that includes a central opening 356-$i$ defined by an inner ring or another circular object. The lower mesh section 354-$i$ further includes a plurality of spokes extending radially outward from the central opening 356-$i$, as well as a plurality of other concentric rings having radii that are progressively larger than the central opening 356-$i$. The inner ring of the lower mesh section 354-$i$ defining the central opening 356-$i$, the spokes or the other concentric rings may have cross-sections of any other shape or size, e.g., squares, rectangles, circles or others, and may have any dimensions, such as widths or diameters of one to two millimeters each, and any lengths. Moreover, the central opening 356-$i$ and the other concentric rings may have any radii or diameters. For example, in some implementations, the central opening 356-$i$ may have a diameter of approximately two to four centimeters (2-4 cm), and the concentric rings may have progressively larger diameters, e.g., approximately nine to ten millimeters (9-10 mm) from the inner ring defining the central opening 356-$i$ or one another in a radial direction. The spokes of the upper mesh section 354-$i$ may have any angular separation from one another, e.g., forty-five degrees, or any fraction thereof, e.g., one-fourth of forty-five degrees.

As is shown in FIGS. 3A and 3B, the upper section 340 includes four upper mesh sections 344, each of which is provided above one of the propulsion motors 322. The lower section 350 includes four lower mesh sections 354, each of which is provided below one of the propulsion motors 322, and joined or otherwise mounted to the lower frame 352 or arms of a chamber to which the propulsion motors 322 are mounted. As is further shown in FIG. 3A, when the upper mesh sections 344 are mounted to the upper frame 342, the central openings 346 of each of the upper mesh sections 344 are coaxially aligned above one of the propulsion motors 322. As is further shown in FIG. 3B, when the lower mesh sections 354 are mounted to the lower frame 352, the central openings 356 of each of the lower mesh sections 344 are coaxially aligned below one of the propulsion motors 322.

As is shown in FIGS. 3A and 3B, the inner rings defining the central openings 356 of each of the lower mesh sections 354 have diameters that are substantially larger than the inner rings defining the central openings 346 of each of the upper mesh sections 344. For example, the central opening 356 may have a diameter of approximately two to four centimeters (2-4 cm), or approximately twice a diameter of the central openings 346, and the concentric rings of the lower mesh sections 354 may have progressively larger diameters. Likewise, the lower mesh sections 354 may include an increased number of spokes or concentric rings that are closer in proximity to one another at outer portions of such sections. In some implementations, one or more concentric rings of the lower mesh sections 354 may have the same dimensions as corresponding concentric rings of the upper mesh sections 344.

As is shown in FIG. 3A, the upper mesh section 344-$i$ includes the central opening 346 aligned with an axis of rotation of a motor 322-$i$ and a propeller 324-$i$, as well as a first set of openings arranged around the central opening 346-$i$, a second set of openings arranged around the first set of openings, and other sets of openings located radially beyond the second set of openings. As is shown in FIG. 3A, a first radial distance from the axis of rotation of the motor 322-$i$ and the propeller 324-$i$ to an inner edge of the central opening 346-$i$ is less than a second radial distance from an outer edge of the central opening 346-$i$ to an inner edge of the first set of openings, and the second radial distance is greater than both a third radial distance from an outer edge of the first set of openings to an inner edge of the second set of openings and the first radial distance.

As is shown in FIG. 3B, the lower mesh section 354-$i$ includes the central opening 356-$i$ aligned with the axis of rotation of the motor 322-$i$ and the propeller 324-$i$, as well as a third set of openings arranged around the central opening 356-$i$, a fourth set of openings arranged around the third set of openings, and other sets of openings located radially beyond the fourth set of openings. As is shown in FIG. 3B, a fourth radial distance from the axis of rotation of the motor 322-$i$ and the propeller 324-$i$ to an inner edge of the central opening 356-$i$ is greater than both a fifth radial distance from an outer edge of the central opening 356-$i$ to an inner edge of the third set of openings and a sixth radial distance from an outer edge of the third set of openings to an inner edge of the fourth set of openings.

The construction of the upper mesh sections 344 and the lower mesh sections 354 may result in improved operation of the motors 322 while enhancing the safety of the aerial vehicle 310. For example, distances between the central openings 346 of the upper mesh sections 344 or the central openings 356 of the lower mesh sections 354 and the concentric rings arranged around them, may be selected to facilitate airflow proximate the hubs of the propellers 324, as compared to airflow proximate to tips or outer edges of the propellers 324. In some implementations, the larger central openings 356 of the lower mesh sections 354 result in enhanced airflow distribution across propellers 324 near their respective hubs.

Further, in some implementations, a density of spokes and concentric rings at outer portions of the lower mesh sections 354 that are provided below tips of the propellers 324 may be greater than a density of spokes and concentric rings at outer portions of the upper mesh sections 344 that are provided above tips of the propellers 324. For example, a number of spokes between outermost concentric rings and next-outermost concentric rings of the lower mesh section 354 may be greater than not only a number of spokes between the inner ring defining the central opening 356 and a first concentric ring of the lower mesh section 354 but also greater than a number of spokes between outermost concentric rings and next-outermost concentric rings of the upper mesh section 344. The greater density of spokes and concentric rings at outer portions of the lower mesh sections 354 may inhibit the unwanted or unintended insertion of fingers or other body parts or objects into the housings 315 through such openings, thereby preventing damage to the motors 322 or the propellers 324, or reducing a risk of injury. Conversely, the distribution and spacing of the spokes and the concentric rings about the central openings 346 of the upper mesh sections 344 may be more regular and consistent throughout the respective upper mesh sections 344.

Moreover, the propellers 324 may be formed from a single-piece construction, and with rigid blades of fixed dimensions, or, alternatively, may have a foldable construction defined by one or more hinges, such that the propeller 324 may be folded into a reduced length or size when not rotating under power, and may be extended to a full length or size when operating under power. Furthermore, where the propeller 324 has a foldable construction, e.g., with blades having one or more hinges, in the event that an object contacts the propeller 324 during operation, the propeller 324 may deflect or fold in response to contact with the object. Such hinges may be provided at or near a hub of the propeller 324, or at any other location along the blades of the propeller 324.

The inner rings defining the central openings 346, 356, as well as the spokes and the concentric rings may have cross-sections of any shape or size, e.g., squares, rectangles, circles or others, and may have any dimensions, such as widths or diameters of one to one-and-one-half millimeters (1-1.5 mm) each, or any other dimensions, and any lengths. Moreover, the central openings 346, 356 and the other concentric rings may have any radii or diameters. Furthermore, the spaces between the respective spokes or concentric rings of the upper mesh sections 344 or the lower mesh sections 354 may be selected on any basis, such as economy, weight, safety or other factors.

As is further shown in FIG. 3B, the substantially slender construction of the landing pegs 358 serves to limit an extent to which the landing pegs 358 may inhibit airflow distribution across the propellers 324. For example, because proximal ends of each of the landing pegs 358 are mounted directly below one of the respective motors 322, e.g., to a support member of the frame 352, and because the landing pegs 358 neck or narrow from the proximal end to the distal ends of the landing pegs 358, the landing pegs 358 remain clear of areas through which air flows prior to entering the housing 315 through the respective lower mesh sections 354.

Figure 4:
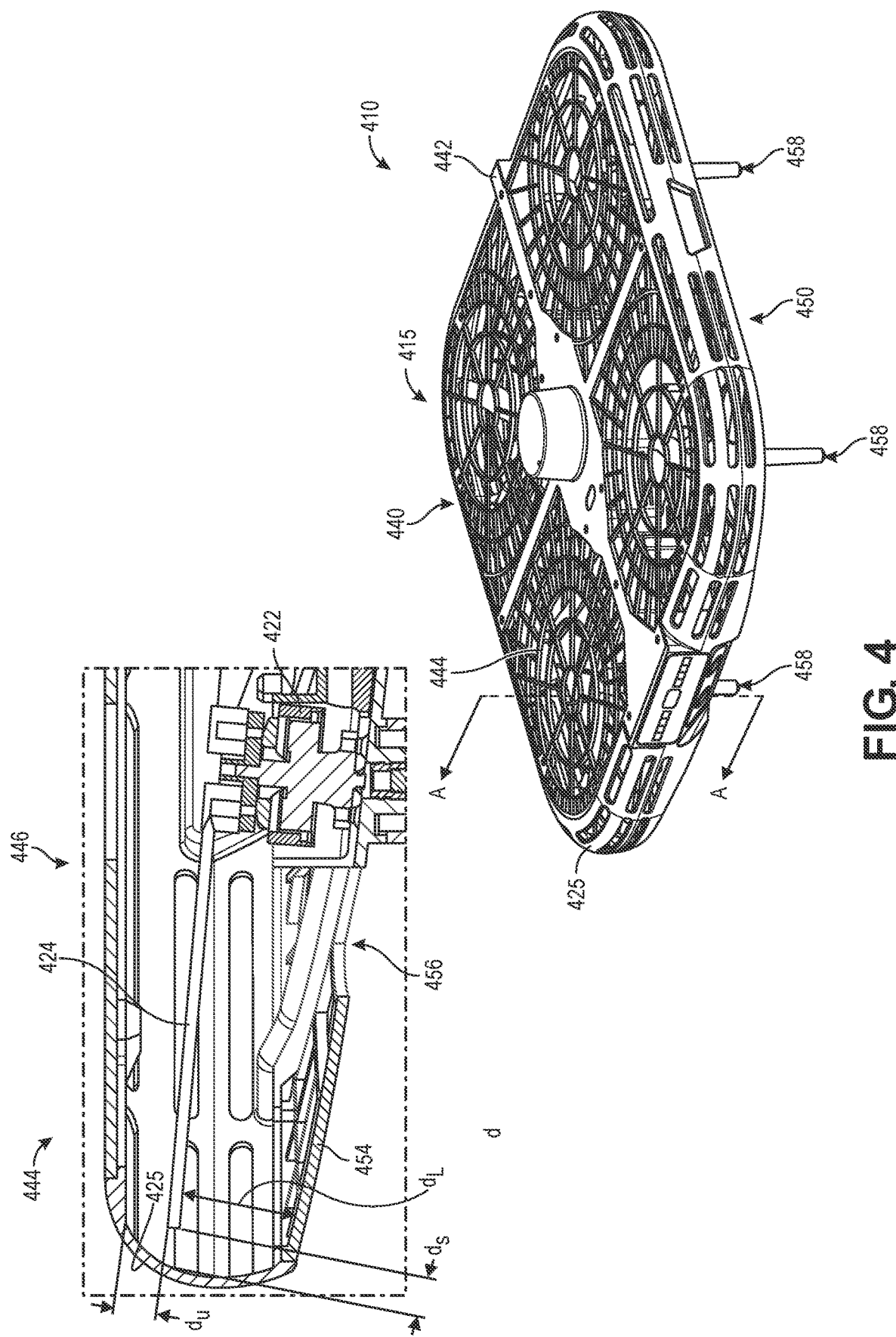
FIG. 4 is a view of aspects of one aerial vehicle in accordance with embodiments of the present disclosure.

Additionally, shrouds (or side sections) that join the upper mesh sections and lower mesh sections to define housings of the aerial vehicles of the present disclosure may have dimensions that are selected to optimize the efficiency of the propellers or motors. Referring to FIG. 4, a view of aspects of one aerial vehicle in accordance with embodiments of the present disclosure is shown. Except where otherwise noted, reference numerals preceded by the number "4" shown in FIG. 4 refer to elements that are similar to elements having reference numerals preceded by the number "3" shown in FIG. 3A or 3B, by the number "2" shown in FIG. 2, by the number "1" shown in FIGS. 1A and 1B.

As is shown in FIG. 4, an aerial vehicle 410 includes a housing 415 formed from a shroud (or a side section) 425, an upper section 440, a lower section 450. As is shown in FIG. 4A, the upper section 440 includes an upper frame 442 and plurality of upper mesh sections 444. The shroud 425 also has a meshed or mesh-like construction.

As is further shown in the section view along lines A-A, a cross-section of the shroud 425 has an arcuate or C-shape to accommodate rotation of propellers 424 within the housing, and to resist deformation or compression of the housing 415 and to avoid contact with the propellers 424. For example, as is shown in FIG. 4, a tip of the propeller 424 is provided at a minimum safety gap $d_U$ from an interior surface of the upper section 440, a minimum safety gap $d_L$ from an interior surface of the lower section 450, and a minimum safety gap $d_S$ from an interior surface of the shroud 425, when the propeller 424 rotates during operation. The lengths or distances of the respective gaps $d_U$, $d_L$, $d_S$ may be selected on any basis, e.g., dimensions or materials from which the propeller 424, the upper section 440, the lower section 450 or the shroud 425 are formed, as well as anticipated rotational speeds of the propellers 424 during operation.

As is discussed above, aerial vehicles of the present disclosure are configured for any type or form of operations within indoor spaces, and may include suites of sensors that are adapted to capture information or data of any kind within such spaces.

Referring to FIGS. 5A through 5D, views of aspects of one aerial vehicle in accordance with implementations of the present disclosure are shown. Except where otherwise noted, reference numerals preceded by the number "5" shown in FIGS. 5A through 5D refer to elements that are similar to elements having reference numerals preceded by the number "4" shown in FIG. 4, by the number "3" shown in FIG. 3A or 3B, by the number "2" shown in FIG. 2, by the number "1" shown in FIGS. 1A and 1B.

Figure 5A:
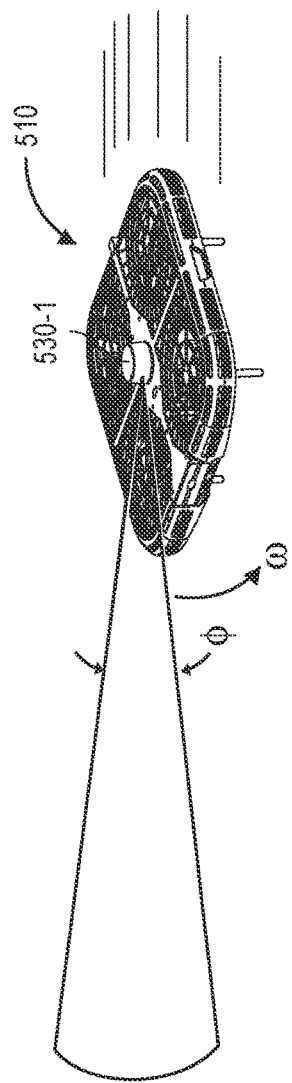

An aerial vehicle 510 is outfitted with a plurality of sensors 530-1, 530-2, 530-3, 530-4. As is shown in FIG. 5A, the aerial vehicle 510 includes a LIDAR sensor 530-1 (or a LIDAR sensor module) that is configured to rotate an illuminator, or an axis or a direction along which the LIDAR sensor 530-1 transmits light, about a yaw axis or another axis extending through a geometric center or centroid of the aerial vehicle 510. By rotating the illuminator or the transmissions of light about the yaw axis, the LIDAR sensor 530-1 may be used to generate depth images, range profiles or other sets of distances covering three hundred sixty degrees around the aerial vehicle 510.

The LIDAR sensor 530-1 extends above the aerial vehicle 510 and is configured to transmit light on axes or directions that may rotate at any angular velocity $@$, such as ten revolutions per second, relative to the housing 515. In some implementations, the LIDAR sensor 530-1 may be configured to calculate distances to objects at an angular range of three hundred sixty degrees about the LIDAR sensor 530-1, and at any maximum measuring radius, e.g., twelve meters (12 m) or more. For example, in some implementations, the LIDAR sensor 530-1 may be configured to transmit light at any measurement frequency, e.g., up to 4,500 Hertz (or 4,500 measurements per second). The transmitted light may be infrared light, or light at any other wavelength or frequency. In some implementations, the LIDAR sensor 530-1 may transmit light in a single direction, and capture or receive reflections of the light from one or more objects. In some implementations, the LIDAR sensor 530-1 may be configured to emit light at a wavelength of approximately 905 nanometers, e.g., within an infrared band, and at a power of approximately twenty-five milliwatts (25 mW).

The LIDAR sensor 530-1 may further combine distances calculated based on times-of-flight with information regarding angles at which the light was emitted and received to generate a point cloud or another representation of positions of objects, which may be processed and stored by the aerial vehicle 510, or transmitted to one or more external devices or systems for processing. The LIDAR sensor 530-1 may also include one or more motor drivers or other components for controlling a start, a stop or a speed of a motor, and may generate and transmit packets of data including any information regarding transmissions or returns, e.g., rotational speeds, start or end angles, time stamps, or other related data.

As is shown in FIG. 5B, the aerial vehicle 510 further includes a plurality of time-of-flight sensors 530A-2, 530B-2, 530C-2 (or time-of-flight sensor modules), which may be mounted in or to one or more chambers or other portions of the aerial vehicle 510. The time-of-flight sensor 530A-2 is configured to transmit light and capture reflections of the light to calculate distances to objects above the aerial vehicle 510. Likewise, the time-of-flight sensors 530B-2, 530C-2 are configured to transmit light and capture reflections of the light to calculate distances to objects below and forward of the aerial vehicle 510, respectively.

In accordance with one or more implementations, the time-of-flight sensors 530A-2, 530B-2, 530C-2 utilize a series of timed pulses, an amplitude modulated pulse, on/off keying, or another approach to facilitate distance determination. For example, in some implementations, the time-of-flight sensors 530A-2, 530B-2, 530C-2 may have fields of view having pyramidal shapes defining angles of approximately forty-five degrees in the x-direction and the y-direction, respectively. In some other implementations, the fields of view in the x-direction and the y-direction may define grids of cells, and the time-of-flight sensors 530A-2, 530B-2, 530C-2 may be configured to determine distance values for each of such cells. The distance values may indicate distances, e.g., upward, downward or forward, to hypothetical planes that are parallel to the respective sensors. Alternatively, one or more of the time-of-flight sensors may be a single-point sensor that is configured to transmit light and capture reflections of the light to calculate a distance to a single point, rather than distances to points in multiple cells.

Reflections of light captured by the LIDAR sensor 530-1 or any of the time-of-flight sensors 530A-2, 530B-2, 530C-2 may be interpreted to construct depth images, range profiles or other sets of distances between such sensors and one or more surfaces above, below or around the aerial vehicle 510, or forward of the aerial vehicle 510, several times per second.

Figure 5C:
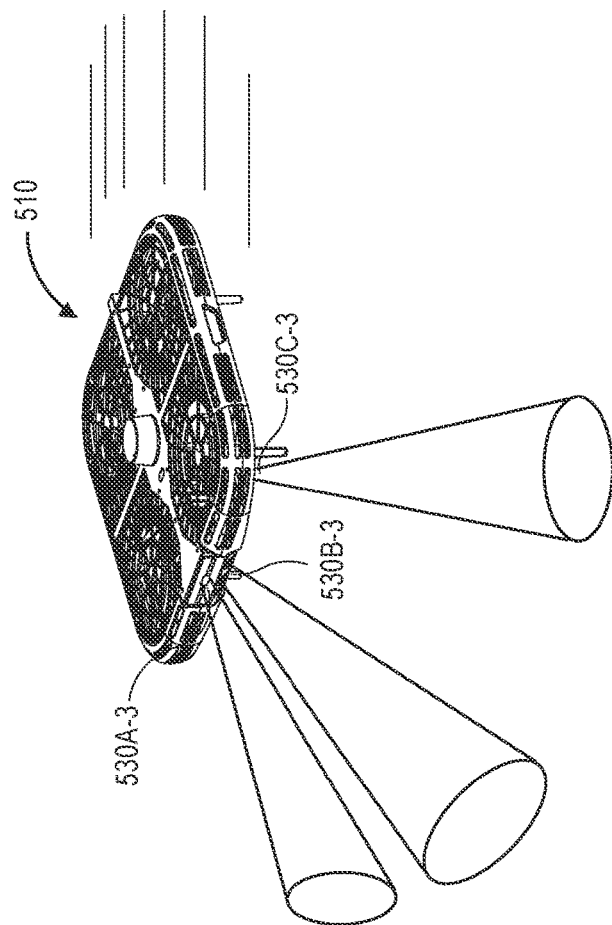

As is shown in FIG. 5C, the aerial vehicle 510 further includes a plurality of cameras 530A-3, 530B-3, 530C-3 (or camera modules), which may be mounted in or to one or more chambers or other portions of the aerial vehicle 510. The camera 530A-3 is aligned and configured to capture imaging data forward of the aerial vehicle 510, e.g., with a field of view having an axis of orientation aligned along or parallel to a roll axis of the aerial vehicle 510, and to process the imaging data captured thereby for any purpose, such as for navigation, object detection, or collision avoidance purposes. The camera 530B-3 is aligned and configured to capture imaging data forward of and below the aerial vehicle 510, e.g., with a field of view having an axis of orientation aligned at an angle below a plane defined by the housing 515 of the aerial vehicle 510, and to process the imaging data for any purpose, such as to monitor an indoor space in which the aerial vehicle 510 operates, to determine whether any events or conditions are present within the indoor space, or to identify such events or conditions. The camera 530C-3 is aligned and configured to capture imaging data below the aerial vehicle 510, e.g., with a field of view having an axis of orientation aligned along or parallel to a roll axis of the aerial vehicle 510, and to process the imaging data captured thereby for any purpose, such as for object detection or landing purposes. For example, imaging data captured by the camera 530C-3 may be processed and interpreted to determine whether a docking station or a surface below the aerial vehicle 510 is sufficiently clear and capable of accommodating a landing of the aerial vehicle 510, or whether one or more obstacles or other objects are present that would prevent the aerial vehicle 510 from landing.

The cameras 530A-3, 530B-3, 530C-3 may be configured to capture color, grayscale or black-and-white images, or any other images (e.g., depth images) in accordance with the present disclosure, or any other imaging data of any type of form.

Figure 5D:
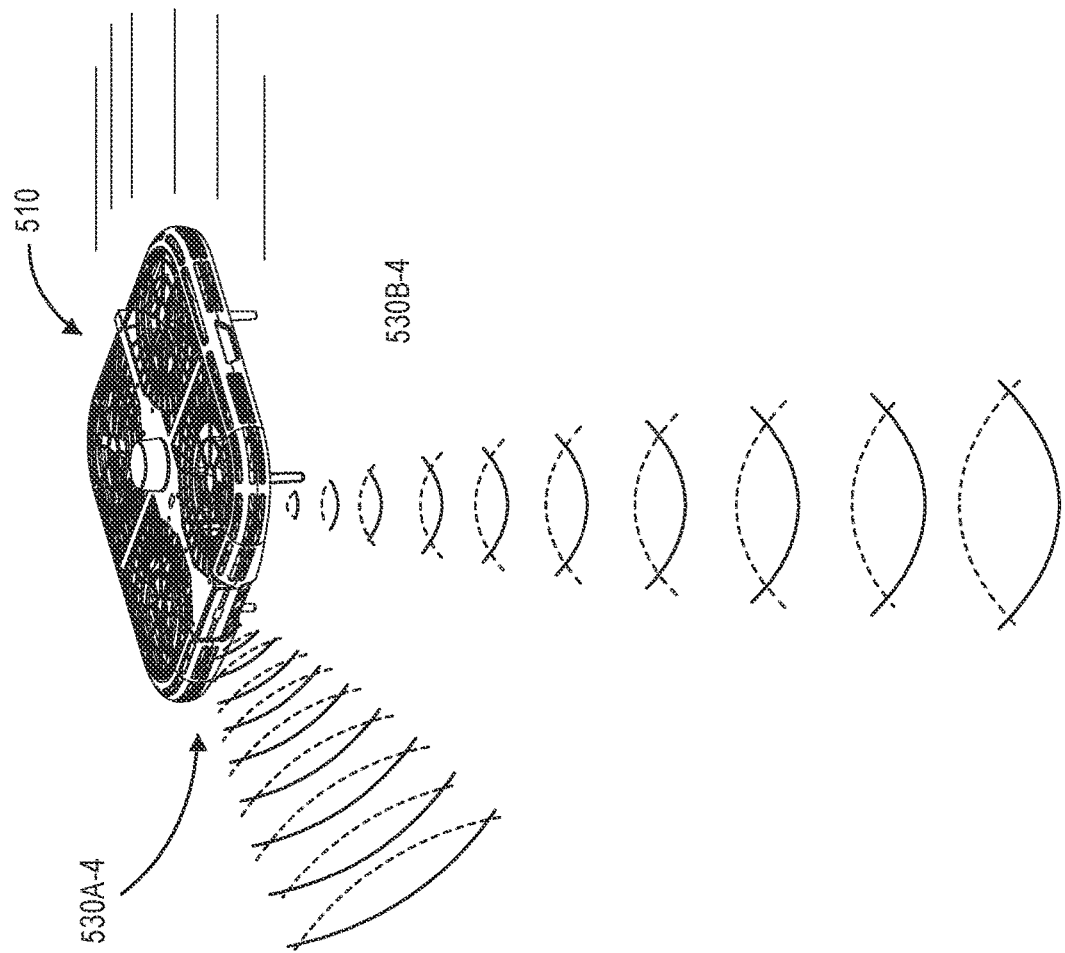

As is shown in FIG. 5D, the aerial vehicle 510 further includes a pair of ultrasonic sensors 530A-4, 530B-4 (or ultrasonic sensor modules), which may be mounted in or to one or more chambers or other portions of the aerial vehicle 510. The ultrasonic sensors 530A-4, 530B-4 are configured to measure distances to objects forward of or below the aerial vehicle 510 by emitting ultrasonic sound waves or pulses, capturing reflections of the sound waves or pulses, and converting the captured sound waves or pulses to electrical signals. The ultrasonic sensors 530A-4, 530B-4 may include transmitters which may include one or more piezoelectric crystals or other components for transmitting sound and receivers which capture reflections of the sound after the sound has returned from an object. The ultrasonic sensors 530A-4, 530B-4 may transmit sounds at any frequency, e.g., frequencies of over twenty-five thousand kilohertz (or 20-40 kHz), beyond the typical audible range of hearing. The ultrasonic sensors 530A-4, 530B-4 may be used as proximity sensors, obstacle detection sensors, or for any other purpose.

Alternatively, or additionally, the aerial vehicle 510 may include any number of other sensors, and such sensors may have any other axes of orientation.

Figure 6:
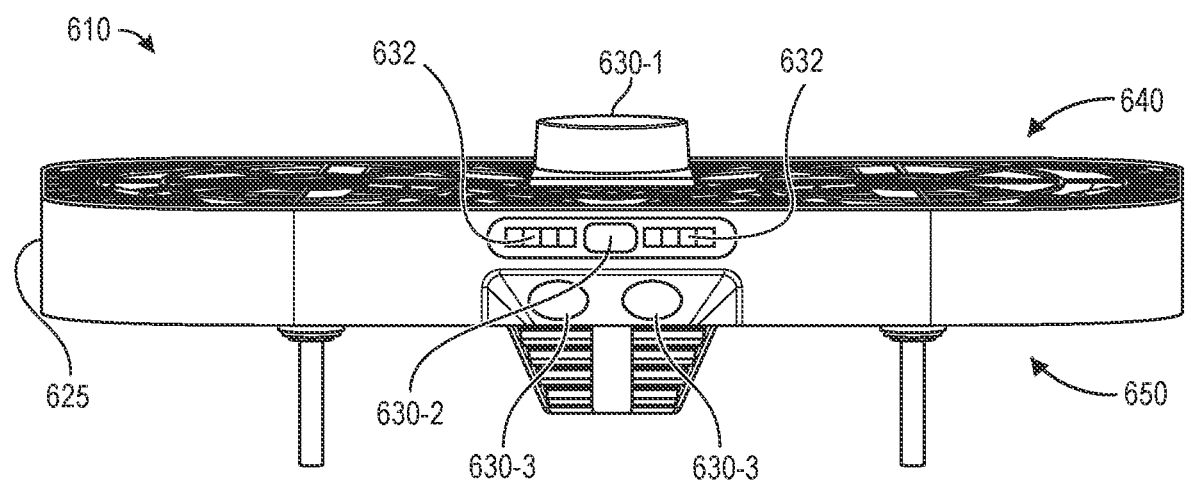
FIG. 6 is a view of aspects of one aerial vehicle in accordance with implementations of the present disclosure.

In some implementations, aerial vehicles of the present disclosure may include shrouds (or side sections) or other components of any shape or size. Referring to FIG. 6, a view of aspects of one aerial vehicle in accordance with implementations of the present disclosure is shown. Except where otherwise noted, reference numerals preceded by the number "6" shown in FIG. 6 refer to elements that are similar to elements having reference numerals preceded by the number "5" shown in FIGS. 5A through 5D, by the number "4" shown in FIG. 4, by the number "3" shown in FIG. 3A or 3B, by the number "2" shown in FIG. 2, by the number "1" shown in FIGS. 1A and 1B.

As is shown in FIG. 6, an aerial vehicle 610 includes a housing 615 defined by a shroud (or a side section) 625 as well as an upper section 640 and a lower section 650 that are fastened or otherwise joined to upper and lower edges of the shroud 625. The aerial vehicle 610 further includes a LIDAR sensor 630-1 provided above the upper section 640, a time-of-flight sensor 630-2 and a pair of sets of illuminators 632 provided on an edge of the shroud 625, and a pair of imaging devices 630-3 (e.g., cameras) provided on a face that is angled downward with respect to the edge of the shroud 625. Unlike the shroud 425 of the aerial vehicle 410 of FIG. 4, the shroud 625 is characterized by a substantially flat surface of a substantially constant height that forms a cross-section having a shape of a rounded square, or a squircle. The shroud 625 thus enhances the stiffness or rigidity of the housing 615, and assists in maintaining the integrity of an interior cavity of the housing 615, which may include any number of propulsion motors or propellers (not shown).

Figure 7A:
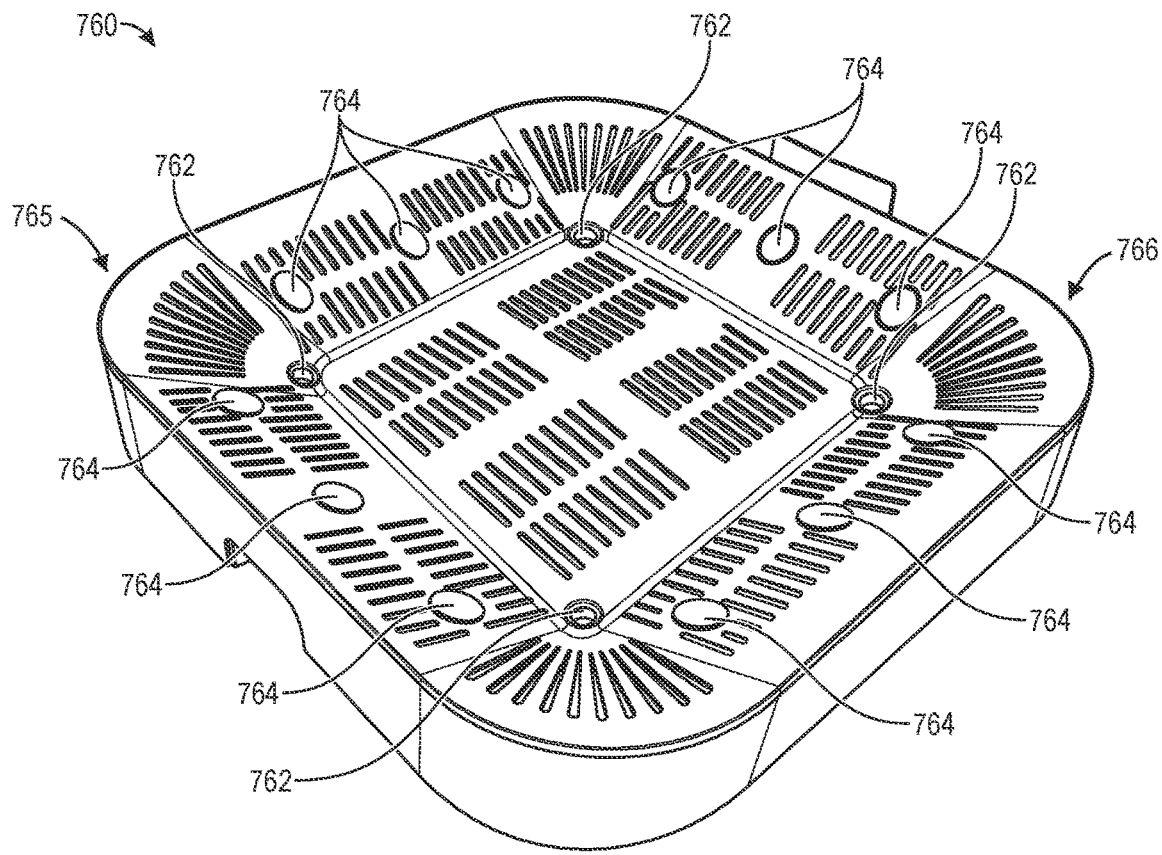
FIGS. 7A and 7B are views of aspects of one system including an aerial vehicle in accordance with embodiments of the present disclosure.
Figure 7B:
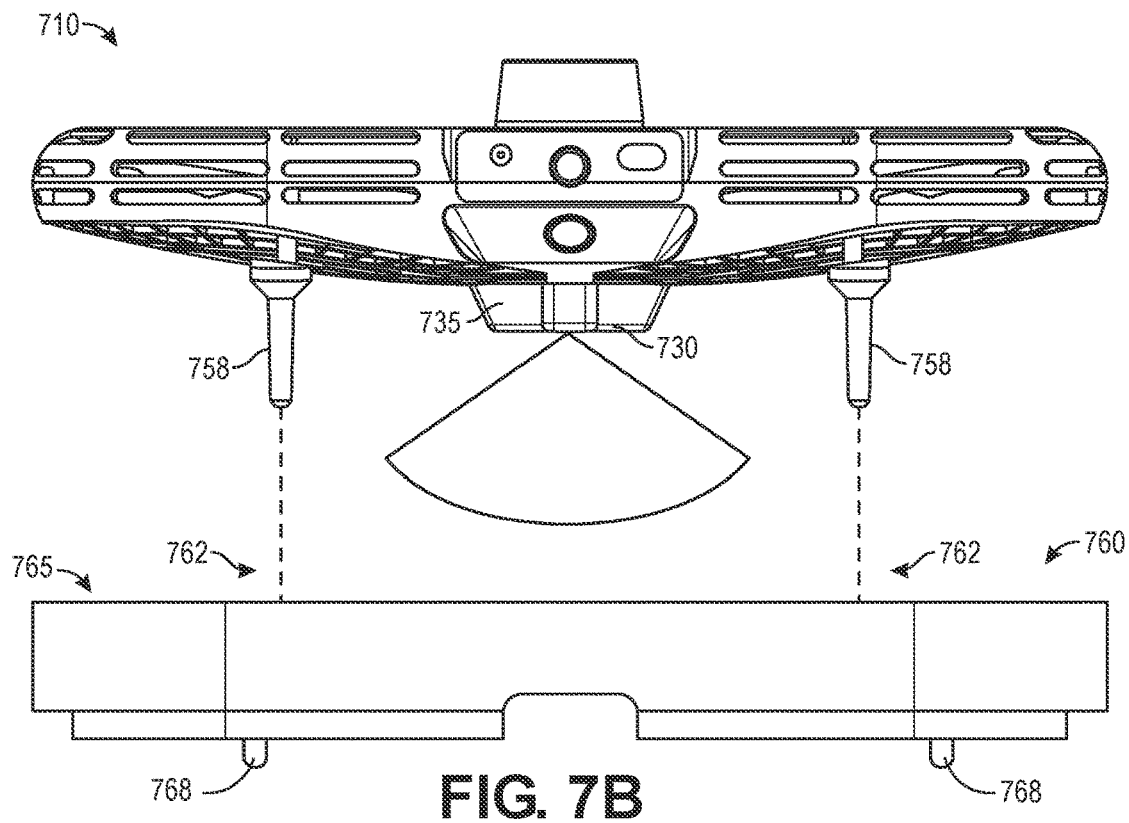

Aerial vehicles of the present disclosure may also operate in association with one or more docking stations (e.g., docks), such as base components, charging docks (or charging stations or docking stations), or other intermediary devices. Referring to FIGS. 7A and 7B, views of aspects of one system including an aerial vehicle in accordance with embodiments of the present disclosure are shown. Except where otherwise noted, reference numerals preceded by the number "7" shown in FIGS. 7A and 7B refer to elements that are similar to elements having reference numerals preceded by the number "6" shown in FIG. 6, by the number "5" shown in FIGS. 5A through 5D, by the number "4" shown in FIG. 4, by the number "3" shown in FIG. 3A or 3B, by the number "2" shown in FIG. 2, by the number "1" shown in FIGS. 1A and 1B.

As is shown in FIG. 7A, a docking station 760 includes a frame 765 defining a depression or other cavity for accommodating portions of an aerial vehicle therein. For example, the docking station 760 has a cross-section having a shape of a rounded square, or squircle, with tapered surfaces descending from edges of the frame 765 into the depression or cavity, to a substantially flat surface.

As is further shown in FIG. 7A, the frame 765 of the docking station 760 also includes a plurality of holes 762 or other openings that are sized and aligned to accommodate landing pegs, struts, feet or other appurtenances or extensions of an aerial vehicle therein. The frame 765 also includes a plurality of illuminators 764 that may be detected within imaging data captured by one or more cameras of an aerial vehicle, as the aerial vehicle descends toward the docking station 760. Alternatively, in lieu of the illuminators 764, or in addition to the illuminators 764, the frame 765 of the docking station 760 may also include any number of retroreflective surfaces or other objects that may be detected within imaging data captured by such cameras. The tapered and flat surfaces of the frame 765 further includes a plurality of slats 766, perforations or other holes or openings that enable downward airflow from an aerial vehicle taking off, landing on or into, or otherwise hovering over the frame 765 to pass through the frame 765 and discharge laterally outwardly therefrom. The slats 766 may also provide ventilation for any electronic components provided within the frame 765, e.g., power or communications systems for providing electrical power or data to aerial vehicles. The flat surfaces of the frame 765 may also include one or more charging contacts or other features (not shown) for mating with corresponding contacts of an aerial vehicle, such as one or more contacts provided on an underside or other portion of the aerial vehicle that is inserted into or enters the cavity defined by the frame 765. Such contacts enable electrical power, information or data to be conveyed between the aerial vehicle and the docking station 760.

As is shown in FIG. 7B, an aerial vehicle 710 descends toward the docking station 760. The aerial vehicle 710 includes a camera 730 provided in association with a chamber 735 descending below a housing of the aerial vehicle 710, as well as a plurality of landing pegs (or struts, or feet) 758, which may be provided in a predetermined arrangement corresponding to an arrangement of the holes 762. For example, each of the landing pegs 758 may be mounted to an underside of the aerial vehicle 710 in predetermined positions or provided at predetermined distances from one another. Each of the holes 762 or other openings may be provided in positions or at distances from one another that correspond to the positions of the landing pegs 758, or distances between the landing pegs 758. Each of the holes 762 may be further sized or shaped to accommodate one of the landing pegs 758 therein. As is further shown in FIG. 7B, the frame 765 of the docking station 760 further includes a set of pegs, feet or extensions 768 that raise a lower surface of the frame 765 above a surface upon which the docking station 760 rests, thereby enabling any downward airflow that entered the frame 765 from above to pass through the frame 765 and discharge laterally outwardly therefrom.

As the aerial vehicle 710 descends, the camera 730 captures imaging data (e.g., visual imaging data or depth imaging data), and detects any number of the illuminators 764 within the cavity defined by the frame 765. The aerial vehicle 710 may make any adjustments to the operation of one or more propulsion motors, control surfaces or other components, as necessary, to guide the aerial vehicle 710 onto the dock in a manner that causes the landing pegs 758 to be inserted into the openings 762.

The contents of U.S. patent application Ser. No. 16/584,721 are incorporated by reference herein in their entirety.

Although some embodiments of the present disclosure show the use of autonomous vehicles in support of one or more applications or functions (e.g., security applications or functions) within indoor spaces of a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function.

Furthermore, although some of the signals or energy that are described as being transmitted or received by one or more transceivers or other sensors herein have specific labels of protocols, standards or frequency bands (e.g., Wi-Fi or Bluetooth), those of ordinary skill in the pertinent arts will recognize that signals or energy may be transmitted or received by one or more transceivers or other sensors at any frequency or at any intensity level, and according to any protocol or standard, in accordance with embodiments of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An aerial vehicle comprising:
a housing formed from an upper section, a lower section and a shroud joined to the upper section and the lower section,
   wherein the housing has a cross-sectional shape of a rounded square having a length approximately equal to a width,
   wherein a height of the housing is approximately one-quarter of the length or the width of the housing,
   wherein the shroud has a meshed construction with a plurality of slats aligned longitudinally about a perimeter of the shroud,
   wherein the shroud comprises a first indentation on a first side of the housing and a second indentation on a second side of the housing opposite the first side,
   wherein the upper section comprises an upper frame and four upper meshes,
   wherein each one of the four upper meshes comprises a central opening defined by an inner ring, a first plurality of radially oriented spokes extending radially outward from the inner ring, a plurality of rings concentric with the inner ring, and a second plurality of radially oriented spokes extending radially outward from one of the plurality of rings concentric with the inner ring,
   wherein the first plurality of radially oriented spokes of each one of the four upper meshes are separated by an angular separation of approximately forty-five degrees,
   wherein the lower section comprises a lower frame and four lower meshes, and
   wherein each one of the four lower meshes comprises a central opening defined by an inner ring, a first plurality of radially oriented spokes extending radially outward from the inner ring, a plurality of rings concentric with the inner ring, and a second plurality of radially oriented spokes extending radially outward from one of the plurality of rings concentric with the inner ring, and
four propulsion motors provided within the housing,
   wherein each of the four propulsion motors is a brushless direct current motor configured to rotate a propeller at one or more rotational speeds,
   wherein each one of the four upper meshes is provided above one of the four propulsion motors and each one of the central openings of the four upper meshes is coaligned with an axis of rotation of one of the four propulsion motors, and
   wherein each one of the four lower meshes is provided below one of the propulsion motors and each one of the central openings of the four lower meshes is coaligned with an axis of rotation of one of the four propulsion motors;
a first chamber disposed at least in part within the housing, wherein at least a portion of the first chamber having a first face extends through the lower section of the housing, and
   wherein the first chamber further comprises:
   a plurality of arms extending from within the housing, wherein each one of the four propulsion motors is coupled to one of the plurality of arms;
   a first time-of-flight sensor disposed within the first chamber, wherein the first time-of-flight sensor is configured to transmit beams of light along a first axis normal to the first face and to capture reflections of the transmitted light;
   a first camera disposed within the first chamber, wherein the first camera has a field of view oriented along a second axis normal to the first face;
   a first ultrasonic sensor disposed within the first chamber, wherein the first ultrasonic sensor is configured to transmit sound from the first face and to capture reflections of the transmitted sound;
   an illuminator configured to project light from the first face; and
   at least one electrical contact provided on the first face; and
four pegs,
   wherein each one of the four pegs has a proximal end coupled to the lower section and a distal end extending
below the first face.

2. The aerial vehicle of claim 1, further comprising:
a second chamber having a second face and a third face, wherein the second chamber is disposed at one edge of the housing, wherein the second face is aligned substantially vertically, and
wherein the second chamber further comprises:
   a second time-of-flight sensor disposed within the second chamber, wherein the second time-of-flight sensor is configured to transmit beams of light along a third axis normal to the second face and to capture reflections of the transmitted light;
   a second camera disposed within the second chamber, wherein the second camera has a field of view oriented along a fourth axis normal to the second face;
   a second ultrasonic sensor disposed within the second chamber, wherein the second ultrasonic sensor is configured to transmit sound from the second face and to capture reflections of the transmitted sound; and
   a third camera disposed within the second chamber, wherein the third camera has a field of view oriented along a fifth axis normal to the third face.

3. The aerial vehicle of claim 1, wherein each of the upper section, the lower section and the shroud is formed from one of:
   an acrylonitrile butadiene styrene;
   a carbon fiber;
   a composite material;
   a metal;
   a polycarbonate;
   a polystyrene;
   a recycled plastic; or
   a rubber.

4. An aerial vehicle comprising:
a housing comprising an upper section, a lower section, and one or more side sections extending between the upper section and the lower section, wherein the housing defines a cross-section substantially having a shape of a rounded square, and wherein a length or a width of the housing is substantially greater than a height of the housing, wherein each one of the side sections comprises a plurality of slats aligned longitudinally about a perimeter of the housing, wherein the upper section comprises an upper frame and a plurality of upper mesh sections coupled to the upper frame, wherein each one of the plurality of upper mesh sections comprises a central opening defined by an inner ring, a plurality of spokes extending radially outward from the inner ring, and a plurality of rings concentric with the inner ring, wherein the plurality of spokes of each one of the upper mesh sections have an angular separation of approximately forty-five degrees, wherein the lower section comprises a lower frame and a plurality of lower mesh sections coupled to the lower frame, wherein each one of the plurality of lower mesh sections comprises a central opening defined by an inner ring, a plurality of spokes extending radially outward from the inner ring, and a plurality of rings concentric with the inner ring, and a plurality of propulsion motors provided within the housing, wherein each one of the propulsion motors is configured to rotate one of a plurality of propellers within the housing at one or more rotational speeds, wherein each one of the upper mesh sections is provided above one of the propulsion motors, and each one of the central openings of the upper mesh sections is coaligned with an axis of rotation of one of the propulsion motors, and wherein each one of the plurality of lower mesh sections is provided above one of the propulsion motors, and each one of the central openings of the upper mesh sections is coaligned with an axis of rotation of one of the propulsion motors; and a plurality of pegs, wherein each one of the plurality of pegs has a proximal end mounted in association with one of the lower mesh sections and a distal end extending below the lower section of the housing, and wherein each one of the distal ends of the plurality of pegs is aligned in a common plane.

5. The aerial vehicle of claim 4, wherein each of the plurality of spokes of the upper mesh sections and each of the plurality of spokes of the lower mesh sections has a thickness of approximately one to two millimeters.

6. The aerial vehicle of claim 4, wherein each one of the plurality of upper mesh sections further comprises a plurality of spokes provided between an outermost concentric ring of the upper mesh sections and a next outermost concentric ring of the upper mesh sections, and wherein a number of spokes between the inner ring defining the central opening of the upper mesh sections and a first concentric ring of the upper mesh sections is less than a number of spokes provided between the outermost concentric ring of the upper mesh sections and the next outermost concentric ring of the upper mesh sections.

7. The aerial vehicle of claim 4, wherein each one of the plurality of lower mesh sections further comprises a plurality of spokes provided between an outermost concentric ring of the lower mesh sections and a next outermost concentric ring of the lower mesh sections, and wherein a number of spokes provided between the inner ring defining the central opening of the lower mesh sections and a first concentric ring of the lower mesh sections is less than a number of spokes provided between the outermost concentric ring of the upper mesh sections and a next outermost concentric ring of the upper mesh sections.

8. The aerial vehicle of claim 4, wherein a diameter of the central opening of each one of the upper mesh sections is approximately one to two centimeters, and wherein a diameter of the central opening of each one of the lower mesh sections is approximately two to four centimeters.

9. The aerial vehicle of claim 4, wherein hubs of each one of the propellers are located above central openings of the lower mesh sections when the propulsion motors are operating, and wherein tips of each one of the propellers are located above outermost concentric rings of the lower mesh sections, next outermost concentric rings of the lower mesh sections, and at least some of the plurality of spokes provided between the outermost concentric rings of the lower mesh sections and the next outermost concentric rings of the lower mesh sections.

10. The aerial vehicle of claim 4, wherein the housing comprises at least one of:
an acrylonitrile butadiene styrene;
a carbon fiber;
a composite material;
a metal;
a polycarbonate;
a polystyrene;
a recycled plastic; or
a rubber.

11. The aerial vehicle of claim 4, wherein each one of the distal ends of the plurality of pegs is mounted beneath one of the plurality of propulsion motors.

12. The aerial vehicle of claim 4, further comprising at least one electrical contact provided on a chamber extending below the lower section of the housing, wherein each one of the distal ends of the plurality of pegs extends below the chamber, wherein each of the distal ends of the plurality of pegs is provided in a predetermined arrangement corresponding to an arrangement of openings on a docking station, wherein each of the openings of the arrangement is sized and shaped to accommodate one of the distal ends of the plurality of pegs, and wherein a location of the at least one electrical contact provided on a surface of the chamber corresponds to a location of at least one electrical contact on a surface of the docking station.

13. The aerial vehicle of claim 4, wherein at least one of the length or the width of the housing is approximately four to six times the height of the housing.

14. The aerial vehicle of claim 4, further comprising:
a chamber having a first face and a second face, wherein the chamber is disposed at one edge of the housing, wherein the first face is aligned substantially vertically, and wherein the chamber further comprises:
a time-of-flight sensor disposed within the chamber, wherein the time-of-flight sensor is configured to transmit beams of light along a first axis normal to the first face and to capture reflections of the transmitted light;
a first camera disposed within the chamber, wherein the first camera has a field of view oriented along a second axis normal to the first face; and a second camera disposed within the chamber, wherein the second camera has a field of view oriented along a third axis normal to the second face.

15. The aerial vehicle of claim 4, further comprising:
a chamber disposed at least in part within the housing, wherein at least a portion of the chamber having a first face extends through the lower section of the housing, and wherein the chamber further comprises:
   a plurality of arms extending from within the housing, wherein each one of the plurality of propulsion motors is coupled to one of the plurality of arms;
   a time-of-flight sensor disposed within the chamber, wherein the time-of-flight sensor is configured to transmit beams of light along a fourth axis normal to the first face and to capture reflections of the transmitted light;
   a camera disposed within the chamber, wherein the camera has a field of view oriented along a fifth axis normal to the first face;
   an ultrasonic sensor disposed within the chamber, wherein the ultrasonic sensor is configured to transmit sound from the first face and to capture reflections of the transmitted sound;
   an illuminator configured to project light from the first face; and
   at least one electrical contact provided on the first face,
wherein each one of the distal ends of the plurality of pegs extends below the first face.

16. An aerial vehicle comprising:
a housing comprising an upper section, a lower section, and one or more side sections extending between the upper section and the lower section, wherein each one of the side sections comprises a plurality of slats aligned longitudinally about a perimeter of the housing;
a plurality of motors disposed within the housing;
a plurality of propellers disposed within the housing,
   wherein each one of the plurality of motors is configured to rotate one of the plurality of propellers at one or more rotational speeds,
   wherein the upper section comprises:
      a plurality of first openings, wherein each one of the first openings is aligned with an axis of rotation of the one of the plurality of propellers:
      a plurality of second openings, wherein each one of the second openings is arranged in a ring around one of the first openings, and wherein each one of the second openings is defined by two of a plurality of spokes extending radially outward from one of the first openings; and
      a plurality of third openings, wherein each one of the third openings is arranged in a ring around a ring of the second openings around one of the first openings, and wherein each one of the third openings is defined by two of a plurality of spokes extending radially outward from one of the second openings,
   wherein a first distance from one axis of rotation to an outer edge of one of the first openings is greater than a second distance from an inner edge of a ring of the third openings to an outer edge of a ring of the third openings, and
   wherein a third distance from an inner edge of the second set of openings to an outer edge of the second set of openings is greater than the second distance,
   wherein the lower section comprises:
      a plurality of fourth openings, wherein each one of the fourth openings is arranged in a ring around the axis of rotation of one of the plurality of propellers, and
      a plurality of fifth openings, wherein each one of the fifth openings is arranged in a ring around a ring of the fourth openings, and wherein each one of the fifth openings is defined by two of a plurality of spokes extending radially outward from one of the fourth openings, and
   wherein a fourth distance from an inner edge of a ring of the fourth openings to an outer edge of the ring of the fourth openings is greater than a fifth distance from an inner edge of a ring of the fifth openings to an outer edge of a ring of the fifth openings; and
a chamber disposed at least in part within the housing, wherein at least a portion of the chamber having a face extends through the lower section of the housing, and wherein the chamber further comprises:
   a plurality of arms extending from the chamber within the housing, wherein each of the plurality of motors is coupled to one of the plurality of arms;
   a time-of-flight sensor disposed within the chamber, wherein the time-of-flight sensor is configured to transmit beams of light along an axis normal to the face and to capture reflections of the transmitted light;
   a camera disposed within the chamber, wherein the camera has a field of view oriented along an axis normal to the face;
   an ultrasonic sensor disposed within the chamber, wherein the ultrasonic sensor is configured to transmit sound from the face and to capture reflections of the transmitted sound;
   an illuminator configured to project light from the face; and
   at least one electrical contact provided on the face; and
a plurality of pegs,
   wherein each one of the plurality of pegs has a proximal end mounted in association with the lower section of the housing and a distal end extending below the chamber, and
   wherein each one of the distal ends is aligned in a common plane.

17. The aerial vehicle of claim 16, wherein the lower section comprises a plurality of support members,
wherein each one of the plurality of support members is aligned with one axis of rotation of one of the plurality of propellers, and
wherein each one of the fourth openings is arranged in a ring around one of the plurality of support members.

18. The aerial vehicle of claim 16,
wherein each one of the first openings is circular, and
wherein the first distance is a radial distance from one axis of rotation to a perimeter of one of the plurality of first openings.

19. The aerial vehicle of claim 18,
wherein a number of the fourth openings arranged around one axis of rotation is greater than a number of the fifth openings arranged around the fourth openings.

20. The aerial vehicle of claim 16, wherein each one of the second set of openings is defined by:
a respective inner arc segment defined relative to one axis of rotation,
a respective outer arc segment defined relative to the one axis of rotation, and a respective first spoke oriented along a respective first radial line extending radially outward from the one axis of rotation between the respective inner arc segment and the respective outer arc segment, and a respective second spoke oriented along a respective second radial line extending radially outward from the one axis of rotation between the respective inner arc segment and the respective outer arc segment, wherein the first radial line and the second radial line are separated by approximately forty-five degrees.

21. The aerial vehicle of claim 16, wherein each one of the fourth openings is defined by:

a respective inner arc segment defined relative to one axis of rotation, a respective outer arc segment defined relative to the one axis of rotation, and a respective first spoke oriented along a respective first radial line extending radially outward from the one axis of rotation between the respective inner arc segment and the respective outer arc segment, and a respective second spoke oriented along a respective second radial line extending radially outward from the one axis of rotation between the respective inner arc segment and the respective outer arc segment.

22. The aerial vehicle of claim 16, wherein the housing has a cross-sectional shape of a rounded square having a length approximately equal to a width, and wherein each of the upper section, the lower section and the one or more side sections is formed from one of:

an acrylonitrile butadiene styrene;

a carbon fiber;

a composite material;

a metal;

a polycarbonate;

a polystyrene;

a recycled plastic; or a rubber.

\* \* \* \* \*